US012733005B2

(12) United States Patent
Kung et al.

(10) Patent No.: US 12,733,005 B2
(45) Date of Patent: Sep. 8, 2026

(54) METHOD AND APPARATUS FOR HANDLING RESOURCES FOR UE-INITIATED BEAM REPORTING IN A WIRELESS COMMUNICATION SYSTEM

(71) Applicant: ASUS Technology Licensing Inc., Taipei City (TW)

(72) Inventors: Yi-Hsuan Kung, Taipei City (TW); Yu-Hsuan Guo, Taipei City (TW); Chun-Wei Huang, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/387,453

(22) Filed: Nov. 12, 2025

(65) Prior Publication Data

US 2026/0143493 A1 May 21, 2026

Related U.S. Application Data

(60) Provisional application No. 63/721,400, filed on Nov. 15, 2024.

(51) Int. Cl.
*H04W 72/21* (2023.01)
*H04B 7/06* (2006.01)

(52) U.S. Cl.
CPC .......... *H04W 72/21* (2023.01); *H04B 7/0626* (2013.01); *H04B 7/06952* (2023.05)

(58) Field of Classification Search
None
See application file for complete search history.

(56) References Cited

U.S. PATENT DOCUMENTS 12,323,936 B2 6/2025 Turtinen et al.
2018/0279265 A1* 9/2018 Shimezawa ........... H04W 72/12
(Continued)

FOREIGN PATENT DOCUMENTS

IN 202517035161 5/2025
WO 2013115715 A1 8/2013

OTHER PUBLICATIONS

3GPP TSG-RAN WG2 Meeting #130, R2-2504732, Samsung, Report of offline discussion [AT130][202][MIMO_Ph5] R2-2504732 (Year: 2023).*
(Continued)

*Primary Examiner* — German Viana Di Prisco
(74) *Attorney, Agent, or Firm* — Skaar Ulbrich Macari, P.A.

(57) ABSTRACT

Methods, systems, and apparatuses are provided for handling resources for User Equipment (UE)-initiated beam reporting in a wireless communication system, wherein a method of a UE comprises being configured with a first Serving Cell associated with a first Timing Advance Group (TAG) and a second Serving Cell associated with a second TAG, wherein the first TAG is a Secondary Timing Advance Group (STAG), being configured with a UE-initiated (UEI) beam reporting configuration associated with the second Serving Cell, wherein the UEI beam reporting configuration contains information associated with one or more Physical Uplink Control Channel (PUCCH) resources on the first Serving Cell and information associated with one or more Physical Uplink Shared Channel (PUSCH) resources on the second Serving Cell, and clearing or releasing the one or more PUSCH resources and the one or more PUCCH resources in response to expiry of a timer of the first TAG.

20 Claims, 11 Drawing Sheets

1000

In response to an expiry of a timer of a first TAG, performing one or more actions for (or on) a first Serving Cell associated with a UEI beam reporting configuration, wherein the one or more actions include at least one of:

release or clear one or more resources for transmitting a UEI beam report for (or on) the first Serving cell, or not transmit a UEI beam report for (or on) the first Serving Cell, or stop using or suspend the resource for transmitting a UEI beam report for (or on) the first Serving cell, or stop using one or more resources of report notification for a UEI beam report for (or on) the first Serving cell, or cancel a triggered (and not cancelled) or pending UEI beam report for (or on) the first Serving cell, or release or clear configuration for a UEI beam report for (or on) the first Serving cell, or stop or suspend evaluation for whether to trigger a UEI beam report for (or on) the first Serving cell

1002

(56) References Cited

U.S. PATENT DOCUMENTS

2024/0276407 A1* 8/2024 Jia .................... H04W 56/001
2025/0081103 A1* 3/2025 Zhou .................... H04W 76/27
2025/0159495 A1* 5/2025 Awadin ................ H04B 7/0626

OTHER PUBLICATIONS

Samsung; Report of MAC open issues for MIMO; Agenda item: 8.12.1; 3GPP TSG-RAN WG2 Meeting #131; R2-250xxxx; Aug. 25-29, 2025; 13 pages.
Samsung; Report of offline discussion [AT130][202][MIMO_Ph5]; 3GPP TSG-RAN WG2 Meeting #130; R2-250xxxx; May 19-23, 2023; 6 pages.

* cited by examiner

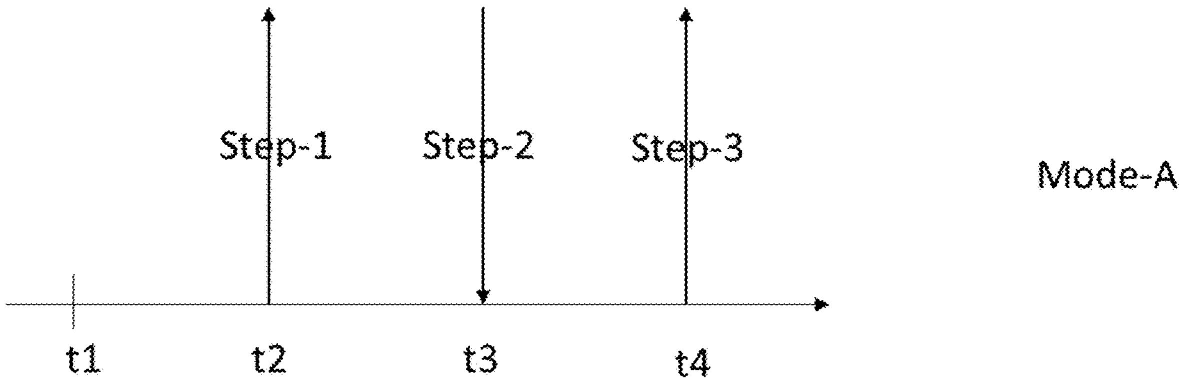
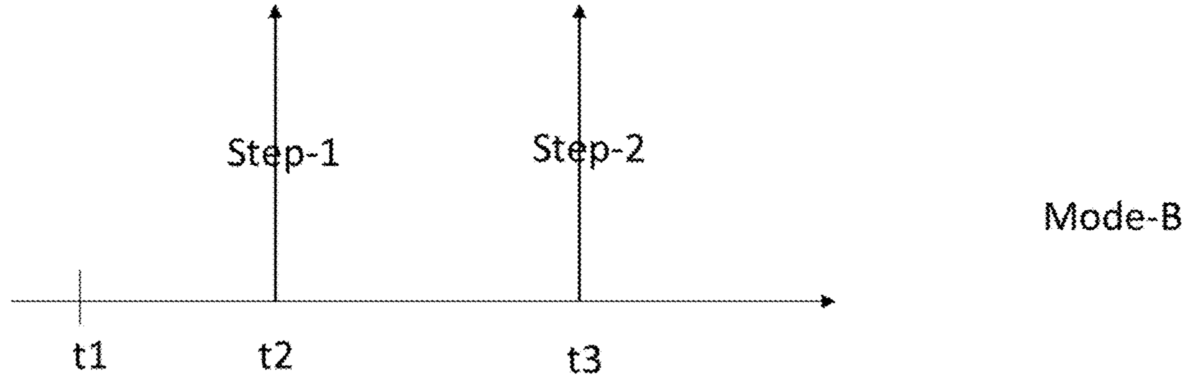
FIG. 5

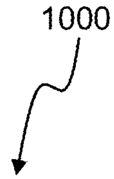

In response to an expiry of a timer of a first TAG, performing one or more actions for (or on) a first Serving Cell associated with a UEI beam reporting configuration, wherein the one or more actions include at least one of:

release or clear one or more resources for transmitting a UEI beam report for (or on) the first Serving cell, or not transmit a UEI beam report for (or on) the first Serving Cell, or stop using or suspend the resource for transmitting a UEI beam report for (or on) the first Serving cell, or stop using one or more resources of report notification for a UEI beam report for (or on) the first Serving cell, or cancel a triggered (and not cancelled) or pending UEI beam report for (or on) the first Serving cell, or release or clear configuration for a UEI beam report for (or on) the first Serving cell, or stop or suspend evaluation for whether to trigger a UEI beam report for (or on) the first Serving cell

METHOD AND APPARATUS FOR HANDLING RESOURCES FOR UE-INITIATED BEAM REPORTING IN A WIRELESS COMMUNICATION SYSTEM

CROSS-REFERENCE TO RELATED APPLICATIONS

The present Application claims priority to and the benefit of U.S. Provisional Patent Application Ser. No. 63/721,400, filed Nov. 15, 2024, which is hereby fully incorporated herein by reference.

FIELD

This disclosure generally relates to wireless communication networks and, more particularly, to a method and apparatus for handling resources for User Equipment (UE)-initiated beam reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for User Equipment (UE)-initiated beam reporting in a wireless communication system, introducing handling Timing Advance (TA) expiration for UE-initiated beam reporting.

In various embodiments, a method for a UE in a wireless communication system comprises being configured with a first Serving Cell associated with a first Timing Advance Group (TAG) and a second Serving Cell associated with a second TAG, wherein the second TAG is a Secondary Timing Advance Group (STAG), being configured with a UE-initiated (UEI) beam reporting configuration associated with the second Serving Cell, wherein the UEI beam reporting configuration contains information associated with one or more Physical Uplink Control Channel (PUCCH) resources on the first Serving Cell and information associated with one or more Physical Uplink Shared Channel (PUSCH) resources on the second Serving Cell, and in response to expiry of a timer of the second TAG or in response to deactivation of the second Serving Cell, clearing or releasing the one or more PUSCH resources and: releasing the one or more PUCCH resources, or not transmitting a PUCCH via the one or more PUCCH resources.

In various embodiments, a method for a UE in a wireless communication system comprises being configured with a first Serving Cell associated with a first TAG and a second Serving Cell associated with a second TAG, wherein the first TAG is a STAG, being configured with a UEI beam reporting configuration associated with the second Serving Cell, wherein the UEI beam reporting configuration contains information associated with one or more PUCCH resources on the first Serving Cell and information associated with one or more PUSCH resources on the second Serving Cell, and clearing or releasing the one or more PUSCH resources and the one or more PUCCH resources in response to expiry of a timer of the first TAG.

BRIEF DESCRIPTION OF THE DRAWINGS

FIG. 5 is an example diagram showing a UE transmitting a UEI report (mode A, mode B), wherein t1 corresponds to a timing that the UE determines that a condition of an event is satisfied or reached and t2 corresponds to a timing that the UE transmits a request to the network node for requesting a UL resource (for transmitting the UEI report), in accordance with embodiments of the present invention.

FIG. 6 is a flow diagram of a method of a UE in a wireless communication system comprising in response to an expiry of a timer of a first TAG, performing one or more actions for (or on) a first Serving Cell associated with a UEI beam reporting configuration, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-234007 New WID: NR MIMO Phase 5; [2] 3GPP 38.214 v17.4.0; [3] 3GPP 38.321 v18.3.0; [4] 3GPP 38.331 v18.3.0; [5] Chair notes RAN1 #118; and [6] Chair's notes RAN1 #118bis. The standards and documents listed above are hereby expressly and fully incorporated herein by reference in their entirety.

Figure 1:
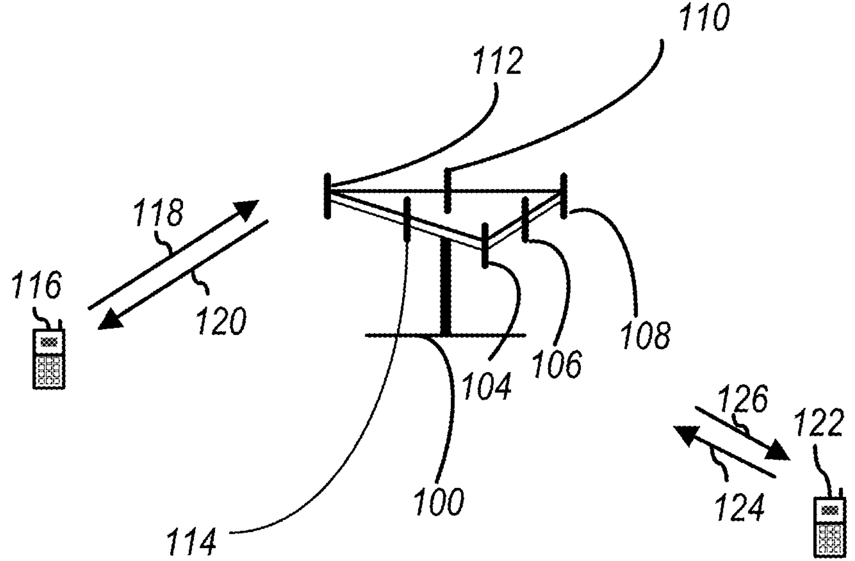
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
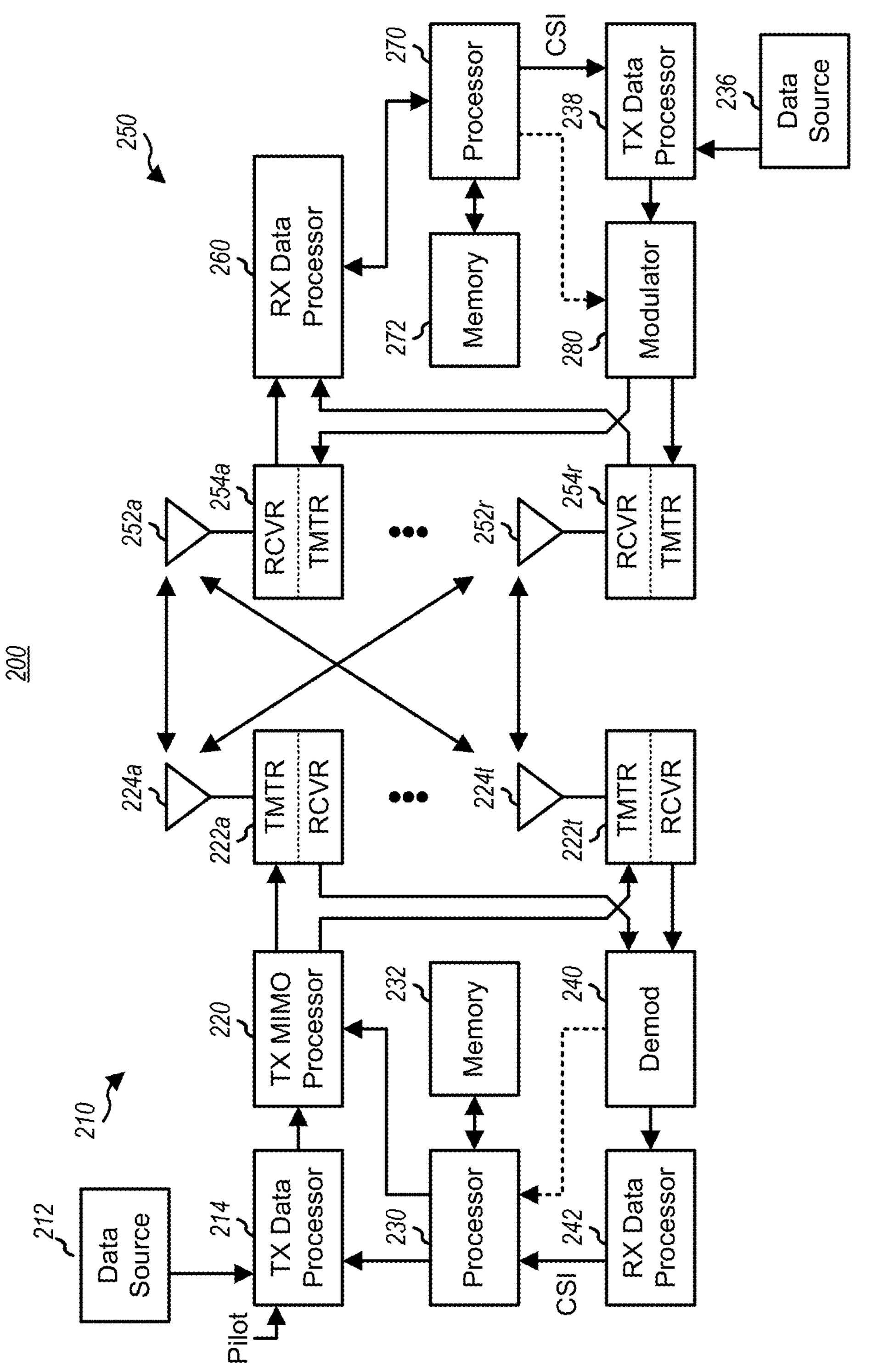
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
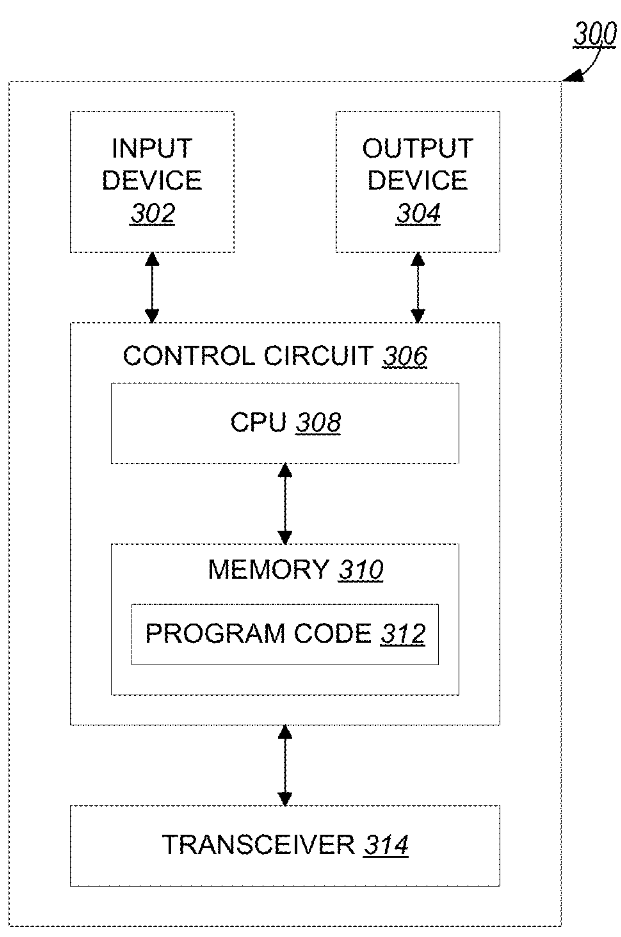
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
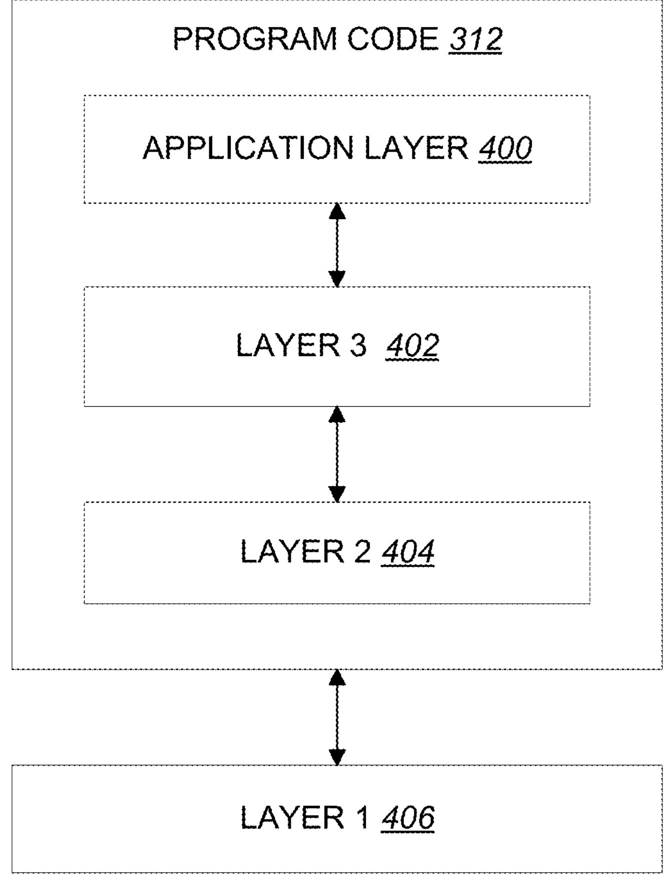
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs. (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In Work item description RP-234007 ([1] RP-234007 New WID: NR MIMO Phase 5), MIMO enhancement for Rel-19 is introduced:

3 Justification

In legacy beam management procedures, the network may configure/activate frequent periodic or semi-persistent beam reporting (e.g., N best beams and corresponding L1-RSRPs) or triggers frequent aperiodic beam reporting to timely acquire the best/preferred beam for data/control transmissions. However, this clearly results in large UL reporting overhead and control signaling overhead. At the same time, if less frequent beam reporting is configured, the network could not always acquire 'best/preferred' beam(s) as the beam reporting by the UE may be outdated, thus leading to performance degradation. Given that UE has better and more-timely knowledge of beam quality changes, UE-initiated beam reporting procedure can lead to more timely beam reports yet with reduced reporting overhead. Under such a procedure, if the UE determines that e.g., current beam(s) quality becomes poor, UE can trigger beam reporting without the network needing to configure or trigger frequent reporting.

. . .

4 Objective 4.1 Objective of SI or Core Part WI or Testing Part WI

The detailed objectives are as follows:

RAN1:

1. Specify enhancement to facilitate UE-initiated/event-driven beam management for reducing overhead and/or latency, assuming the unified TCI while leveraging (as much as possible) legacy CSI measurement and reporting configuration frameworks, targeting FR2 and sTRP with intra- and inter-cell beam management Quotation End In 38.214 ([2] 3GPP 38.214 v17.4.0), CSI reporting is introduced:

5.2 UE Procedure for Reporting Channel State Information (CSI)

5.2.1 Channel State Information Framework

The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTriggerSize.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (L1), rank indicator (RI), L1-RSRP, L1-SINR or Capability Index.

For CQI, PMI, CRI, SSBRI, L1, RI, L1-RSRP, L1-SINR, Capability [Set]Index a UE is configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

5.2.1.1 Reporting Settings

Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (L1), L1-RSRP, L1-SINR, CRI, and SSBRI (SSB Resource Indicator) and Capability Index.

The time domain behavior of the CSI-ReportConfig is indicated by the higher layer parameter reportConfigType and can be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH' CSI reporting, the configured periodicity and slot offset applies in the numerology of the UL BWP in which the CSI report is configured to be transmitted on.

5.2.1.2 Resource Settings

Each CSI Resource Setting CSI-ResourceConfig contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

The time domain behavior of the CSI-RS resources within a CSI Resource Setting are indicated by the higher layer parameter resourceType and can be set to aperiodic, periodic, or semi-persistent. For periodic and semi-persistent CSI Resource Settings, when the UE is configured with groupBasedBeamReporting-r17, the number of CSI Resource Sets configured is S=2, otherwise the number of CSI-RS Resource Sets configured is limited to S=1. For periodic and semi-persistent CSI Resource Settings, the configured periodicity and slot offset is given in the numerology of its associated DL BWP, as given by BWP-id. When a UE is configured with multiple CSI-ResourceConfigs consisting the same NZP CSI-RS resource ID, the same time domain behavior shall be configured for the CSI-ResourceConfigs. When a UE is configured with multiple CSI-ResourceConfigs consisting the same CSI-IM resource ID, the same time-domain behavior shall be configured for the CSI-ResourceConfigs. All CSI Resource Settings linked to a CSI Report Setting shall have the same time domain behavior.

The following are configured via higher layer signaling for one or more CSI Resource Settings for channel and interference measurement:

CSI-IM resource for interference measurement as described in Clause 5.2.2.4.

NZP CSI-RS resource for interference measurement as described in Clause 5.2.2.3.1.

NZP CSI-RS resource for channel measurement as described in Clause 5.2.2.3.1.

The UE may assume that the NZP CSI-RS resource(s) for channel measurement and the CSI-IM resource(s) for interference measurement configured for one CSI reporting are resource-wise QCLed with respect to 'typeD'. When NZP CSI-RS resource(s) is used for interference measurement, the UE may assume that the NZP CSI-RS resource for channel measurement and the CSI-IM resource or NZP CSI-RS resource(s) for interference measurement configured for one CSI reporting are QCLed with respect to 'typeD'.

. . .

5.2.1.4 Reporting Configurations

The UE shall calculate CSI parameters (if reported) assuming the following dependencies between CSI parameters (if reported)

L1 shall be calculated conditioned on the reported CQI, PMI, RI and CRI

CQI shall be calculated conditioned on the reported PMI, RI and CRI

PMI shall be calculated conditioned on the reported RI and CRI

RI shall be calculated conditioned on the reported CRI.

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Clause 5.2.1.5.2. Aperiodic CSI-RS is configured and triggered/activated as described in Clause 5.2.1.5.1.

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Semi-Persistent CSI-RS | Not Supported | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Aperiodic CSI-RS | Not Supported | Not Supported | Triggered by DCI; additionally, subselection indication as described in clause 6.1.3.13 of [10, TS 38.321] possible as defined in Clause 5.2.1.5.1. |

For a semi-persistent CSI report on PUSCH, the periodicity $T_{CSI}$ (measured in slots) is configured by the higher layer parameter reportSlotConfig. Unless specified otherwise, the UE shall transmit the CSI report in frames with SFN $n_f$ and slot number within the frame $$n_{s,f}^{\mu}$$

satisfying $$\left(N_{slot}^{frame,\mu}\left(n_f - n_f^{start}\right) + n_{s,f}^{\mu} - n_{s,f}^{start}\right) \bmod T_{CSI} = 0$$

where $$n_f^{start} \text{ and } n_{s,f}^{start}$$

are the SFN and slot number within the frame respectively of the initial semi-persistent PUSCH transmission according to the activating DCI.

For a semi-persistent or aperiodic CSI report on PUSCH, the allowed slot offsets are configured by the following higher layer parameters:

if triggered/activated by DCI format 0_2 and the higher layer parameter reportSlotOffsetListDCI-0-2 is configured, the allowed slot offsets are configured by reportSlotOffsetListDCI-0-2, and if triggered/activated by DCI format 0_1 and the higher layer parameter reportSlotOffsetListDCI-0-1 is configured, the allowed slot offsets are configured by reportSlotOffsetListDCI-0-1, and otherwise, the allowed slot offsets are configured by the higher layer parameter reportSlotOffsetList.

The offset is selected in the activating/triggering DCI.

. . .

5.2.1.4.1 Resource Setting Configuration

For aperiodic CSI, each trigger state configured using the higher layer parameter CSI-AperiodicTriggerState is associated with one or multiple CSI-ReportConfig where the CSI-ReportConfig not configured with groupBasedBeamReporting-r17 is linked to periodic, or semi-persistent, or aperiodic resource setting(s):

When one Resource Setting is configured, the Resource Setting (given by higher layer parameter resourcesForChannelMeasurement) is for channel measurement for L1-RSRP or for channel and interference measurement for L1-SINR computation.

For aperiodic CSI, and for periodic and semi-persistent CSI resource settings, each trigger state configured using the higher layer parameter CSI-AperiodicTriggerState is associated with one or multiple CSI-ReportConfig where the CSI-ReportConfig configured with groupBasedBeamReporting-r17 is linked to periodic or semi-persistent, setting(s):

When one Resource Setting is configured, the Resource setting is given by resourcesForChannelMeasurement for L1-RSRP measurement. In such a case, the number of configured CSI Resource Sets in the Resource Setting is S=2

For aperiodic CSI, and for aperiodic CSI resource settings, each trigger state configured using the higher layer parameter CSI-AperiodicTriggerState is associated with one or multiple CSI-ReportConfig where the CSI-ReportConfig configured with groupBasedBeamReporting-r17 is associated with resourcesForChannel and resourcesForChannel2, which correspond to first and second resource sets, respectively, for L1-RSRP measurement.

For semi-persistent or periodic CSI, each CSI-ReportConfig is linked to periodic or semi-persistent Resource Setting(s):

When one Resource Setting (given by higher layer parameter resourcesForChannelMeasurement) is configured, the Resource Setting is for channel measurement for L1-RSRP or for channel and interference measurement for L1-SINR computation.

. . .

5.2.1.5 Triggering/Activation of CSI Reports and CSI-RS 5.2.1.5.1 Aperiodic CSI Reporting/Aperiodic CSI-RS when the Triggering PDCCH and the CSI-RS have the Same Numerology For CSI-RS resource sets associated with Resource Settings configured with the higher layer parameter resource Type set to 'aperiodic', 'periodic', or 'semi-persistent', trigger states for Reporting Setting(s) (configured with the higher layer parameter reportConfigType set to 'aperiodic') and/or Resource Setting for channel and/or interference measurement on one or more component carriers are configured using the higher layer parameter CSI-AperiodicTriggerStateList. For aperiodic CSI report triggering, a single set of CSI triggering states are higher layer configured, wherein the CSI triggering states can be associated with any candidate DL BWP. A UE is not expected to receive more than one DCI with non-zero CSI request field per slot per cell. A UE is not expected to receive DCI with non-zero CSI request field within a cell group in a slot overlapping with any slot receiving DCI with non-zero CSI request field in the same cell group. A UE is not expected to be configured with different TCI-StateId's for the same aperiodic CSI-RS resource ID configured in multiple aperiodic CSI-RS resource sets with the same triggering offset in the same aperiodic trigger state. A UE is not expected to receive more than one aperiodic CSI report request for transmission in a given slot per cell. A UE is not expected to receive an aperiodic CSI report request for transmission in a slot overlapping with any slot having an aperiodic CSI report transmission in the same cell group. If a UE does not indicate its capability of CSItriggerStateContainingNonactiveBWP the UE is not expected to be triggered with a CSI report for a non-active DL BWP. Otherwise, when a UE is triggered with a CSI report for a DL BWP that is non-active when expecting to receive the most recent occasion, no later than the CSI reference resource, of the associated NZP CSI-RS, the UE is not expected to report the CSI for the non-active DL BWP and the CSI report associated with that BWP is omitted. When a UE is triggered with aperiodic NZP CSI-RS in a DL BWP that is non-active when expecting to receive the NZP CSI-RS, the UE is not expected to measure the aperiodic CSI-RS. In the carrier of the serving cell expecting to receive that associated NZP CSI-RS, if the active DL BWP when receiving the NZP CSI-RS is different from the active DL BWP when receiving the triggering DCI.

- the last symbol of the PDCCH span of the DCI carrying the BWP switching shall be no later than the last symbol of the PDCCH span of the DCI carrying the CSI trigger, irrespective of whether they are in the same carrier of a serving cell or not and irrespective of whether they are in the same SCS or not;
- the UE is not expected to have any other BWP switching in that carrier after the last symbol of the PDCCH span covering the DCI carrying the CSI trigger and before the first symbol of the triggered NZP CSI-RS or CSI-IM.
- when the PDCCH reception includes two PDCCH candidates from two respective search space sets, as described in clause 10.1 of [6, TS 38.213], the span that involves the PDCCH candidate that ends later in time is used.

A trigger state is initiated using the CSI request field in DCI.

- When all the bits of CSI request field in DCI are set to zero, no CSI is requested.
- When the number of configured CSI triggering states in CSI-AperiodicTriggerStateList is greater than $2^{N_{TS}}-1$, where $N_{TS}$ is the number of bits in the DCI CSI request field, the UE receives a subselection indication, as described in clause 6.1.3.13 of [10, TS 38.321], used to map up to $2^{N_{TS}}-1$ trigger states to the codepoints of the CSI request field in DCI. $N_{TS}$ is configured by the higher layer parameter reportTriggerSize where $N_{TS}\in\{0,1,2,3,4,5,6\}$. When the UE would transmit a PUCCH with HARQ-ACK information in slot n corresponding to the PDSCH carrying the subselection indication, the corresponding action in [10, TS 38.321] and UE assumption on the mapping of the selected CSI trigger state(s) to the codepoint(s) of DCI CSI request field shall be applied starting from the first slot that is after slot $$n + 3N_{slot}^{subframe,\mu} + \frac{2^{\mu}}{2^{\mu_{K_{mac}}}} \cdot k_{mac}$$

where μ is the SCS configuration for the PUCCH and $\Delta_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided.
- When the number of CSI triggering states in CSI-AperiodicTriggerStateList is less than or equal to $2^{N_{TS}}-1$, the CSI request field in DCI directly indicates the triggering state.
- For each aperiodic CSI-RS resource in a CSI-RS resource set associated with each CSI triggering state, the UE is indicated the quasi co-location configuration of quasi co-location RS source(s) and quasi co-location type(s), as described in clause 5.1.5, through higher layer signaling of qcl-info which contains a list of references to TCI-State's for the aperiodic CSI-RS resources associated with the CSI triggering state. If a State referred to in the list is configured with a reference to an RS configured with qcl-Type set to 'typeD', that RS may be an SS/PBCH block located in the same or different CC/DL BWP or a CSI-RS resource configured as periodic or semi-persistent located in the same or different CC/DL BWP.
- A non-zero codepoint of the CSI request field in the DCI is mapped to a CSI triggering state according to the order of the associated positions of the up to $2^{N_{TS}}-1$ trigger states in CSI-AperiodicTriggerStateList with codepoint '1' mapped to the triggering state in the first position.

For a UE configured with the higher layer parameter CSI-AperiodicTriggerStateList, if a Resource Setting linked to a CSI-ReportConfig has multiple aperiodic resource sets, only one of the aperiodic CSI-RS resource sets from the Resource Setting is associated with the trigger state, and the UE is higher layer configured per trigger state per Resource Setting to select the one CSI-IM/NZP CSI-RS resource set from the Resource Setting.

If the UE is configured with a single carrier for uplink, the UE is not expected to transmit more than one aperiodic CSI report triggered by different DCIs on overlapping OFDM symbols.

Quotation End

In 38.321 ([3] 3GPP 38.321 v18.3.0), UL time alignment, Scheduling request, and configured grant are introduced:

Timing Advance Group: A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

. . .

5.2 Maintenance of Uplink Time Alignment

RRC configures the following parameters for the maintenance of UL time alignment:

timeAlignmentTimer (per TAG) which controls how long the MAC entity considers the Serving Cells to the associated TAG to be uplink time aligned for the TAG;

inactivePosSRS-TimeAlignmentTimer which controls how long the MAC entity considers the Positioning SRS transmission in RRC_INACTIVE in clause 5.26 to be uplink time aligned;

cg-SDT-TimeAlignmentTimer which controls how long the MAC entity considers the uplink transmission for CG-SDT to be uplink time aligned;

inactivePosSRS-ValidityAreaTAT which controls how long the MAC entity considers Positioning SRS transmission in RRC_INACTIVE in clause 5.26 to be uplink time aligned when SRS positioning validity area is configured.

The MAC entity shall:

1> when a Timing Advance Command MAC CE is received, and if an $N_{TA}$ (as defined in TS 38.211 [8]) has been maintained with the indicated TAG:

2> apply the Timing Advance Command for the indicated TAG;

2> if there is ongoing Positioning SRS Transmission in RRC_INACTIVE as in clause 5.26:

3> if SRS positioning validity area is configured:

4> start or restart the inactivePosSRS-ValidityAreaTAT associated with the indicated TAG.

3> else:

4> start or restart the inactivePosSRS-TimeAlignmentTimer associated with the indicated TAG.

2> if CG-SDT procedure triggered as in clause 5.27 is ongoing:

3> start or restart the cg-SDT-TimeAlignmentTimer associated with the indicated TAG.

2> else:

3> start or restart the timeAlignmentTimer associated with the indicated TAG.

1> when a Timing Advance Command is received in a Random Access Response message for a Serving Cell configured with two TAGs or in a MSGB for an SpCell configured with two TAGS:

2> if the Random Access Preamble was not selected by the MAC entity among the contention-based Random Access Preamble:

3> apply the Timing Advance Command for the TAG indicated in the received Random Access Response message or MSGB:

3> start or restart the timeAlignmentTimer associated with TAG indicated in the received Random Access Response message or MSGB.

2> else if the timeAlignmentTimer associated with the TAG indicated in the received Random Access Response message or MSGB is not running:

3> apply the Timing Advance Command for this TAG;

3> start the timeAlignmentTimer associated with this TAG;

3> when the Contention Resolution is considered not successful as described in clause 5.1.5:

4> stop the timeAlignmentTimer associated with this TAG.

2> else:

3> ignore the received Timing Advance Command.

1> when a Timing Advance Command is received in a Random Access Response message for a Serving Cell not configured with two TAGs or in a MSGB for an SpCell not configured with two TAGs:

2> if the Random Access Preamble was not selected by the MAC entity among the contention-based Random Access Preamble:

3> apply the Timing Advance Command for this TAG;

3> start or restart the timeAlignmentTimer associated with this TAG.

2> else if the timeAlignmentTimer associated with this TAG is not running:

3> apply the Timing Advance Command for this TAG;

3> start the timeAlignmentTimer associated with this TAG;

3> when the Contention Resolution is considered not successful as described in clause 5.1.5; or 3> when the Contention Resolution is considered successful for SI request as described in clause 5.1.5, after transmitting HARQ feedback for MAC PDU including UE Contention Resolution Identity MAC CE:

4> stop timeAlignmentTimer associated with this TAG.

3> when the Contention Resolution is considered not successful as described in clause 5.1.5:

4> if CG-SDT procedure triggered as in clause 5.27 is ongoing:

5> set the $N_{TA}$ value to the value before applying the received Timing Advance Command as in TS 38.211 [8].

3> when the Contention Resolution is considered successful for Random Access procedure while the CG-SDT procedure is ongoing:

4> stop timeAlignmentTimer associated with this TAG;

4> start or restart the cg-SDT-TimeAlignmentTimer associated with this TAG.

3> when the Contention Resolution is considered successful for Random Access procedure while SRS transmission in RRC_INACTIVE is ongoing:

4> if SRS positioning validity area is configured:

5> start or restart the inactivePosSRS-ValidityAreaTAT associated with the indicated TAG.

4> else:

5> start or restart the inactivePosSRS-TimeAlignmentTimer associated with this TAG.

2> else:

3> ignore the received Timing Advance Command.

1> when an Absolute Timing Advance Command is received in response to a MSGA transmission including C-RNTI MAC CE, as specified in clause 5.1.4a, for an SpCell configured with two TAGS:

2> apply the Timing Advance Command for the PTAG indicated in the Absolute Timing Advance Command MAC CE;

2> start or restart the timeAlignmentTimer associated with this PTAG.

1> when an Absolute Timing Advance Command is received in response to a MSGA transmission including C-RNTI MAC CE, as specified in clause 5.1.4a, for an SpCell not configured with two TAGS:
2> apply the Timing Advance Command for PTAG;
2> if there is ongoing Positioning SRS Transmission in RRC_INACTIVE as in clause 5.26:
3> if SRS positioning validity area is configured:
4> start or restart the inactivePosSRS-ValidityAreaTAT associated with the indicated TAG.
3> else:
4> start or restart the inactivePosSRS-TimeAlignmentTimer associated with the indicated TAG.
2> if CG-SDT procedure is ongoing:
3> start or restart the cg-SDT-TimeAlignmentTimer associated with PTAG.
2> else:
3> start or restart the timeAlignmentTimer associated with PTAG.

. . .

1> when a timeAlignmentTimer expires:
2> if the timeAlignmentTimer is associated with a PTAG and the SpCell is not configured with two PTAGs; or
2> if the timeAlignmentTimer is associated with a PTAG, the SpCell is configured with two PTAGs, and the timeAlignmentTimer associated with the other PTAG is not running:
3> flush all HARQ buffers for all Serving Cells;
3> notify RRC to release PUCCH for all Serving Cells, if configured;
3> notify RRC to release SRS for all Serving Cells, if configured;
3> clear any configured downlink assignments and configured uplink grants;
3> clear any PUSCH resource for semi-persistent CSI reporting;
3> consider all running timeAlignmentTimers as expired;
3> maintain $N_{TA}$ (defined in TS 38.211 [8]) of all TAGs.
2> else:
3> if the timeAlignmentTimer is associated with a TAG for an SCell configured with only this TAG; or
3> if the timeAlignmentTimer is associated with a TAG for an SCell, and if the SCell is configured with two TAGs and the timeAlignmentTimer associated with the other TAG is not running:
4> flush all HARQ buffers for all such SCells;
4> notify RRC to release PUCCH, if configured for all such SCells;
4> notify RRC to release SRS, if configured for all such SCells;
4> clear any configured downlink assignments and configured uplink grants for all such SCells;
4> clear any PUSCH resource for semi-persistent CSI reporting for all such SCells;
4> maintain $N_{TA}$ (defined in TS 38.211 [8]) of this TAG.
3> else if the timeAlignmentTimer is associated with a TAG for a Serving Cell configured with two TAGs, and if the timeAlignmentTimer associated with the other TAG is running, for all such Serving Cells:
4> clear any configured downlink assignment, if the activated TCI state(s) for all PUCCH resources configured for the configured downlink assignment is associated with the TAG of the expired timeAlignmentTimer;
4> clear any configured uplink grant, if the activated TCI state(s) for the configured uplink grant is associated with the TAG of the expired timeAlignmentTimer;
4> clear any PUSCH resource for semi-persistent CSI reporting, if the activated TCI state(s) for the PUSCH resource is associated with the TAG of the expired timeAlignmentTimer;
4> maintain $N_{TA}$ (defined in TS 38.211 [8]) of this TAG.

. . .

5.8 Transmission and Reception without Dynamic Scheduling 5.8.2 Uplink

There are two types of transmission without dynamic grant:
configured grant Type 1 where an uplink grant is provided by RRC, and stored as configured uplink grant;
configured grant Type 2 where an uplink grant is provided by PDCCH, and stored or cleared as configured uplink grant based on L1 signalling indicating configured uplink grant activation or deactivation.

Type 1 and Type 2 are configured by RRC for a Serving Cell per BWP. Multiple configurations can be active simultaneously in the same BWP. For Type 2, activation and deactivation are independent among the Serving Cells. For the same BWP, the MAC entity can be configured with both Type 1 and Type 2.

A multi-PUSCH configured grant has multiple consecutive configured uplink grants within a periodicity. Both Type 1 and Type 2 can be configured for a multi-PUSCH configured grant by RRC.

Only configured grant Type 1 can be configured for CG-SDT or for RACH-less LTM cell switch or for RACH-less handover. CG-SDT can only be configured on initial BWP.

RRC configures the following parameters when the configured grant Type 1 is configured:
cs-RNTI: CS-RNTI for retransmission;
cg-SDT-CS-RNTI: CS-RNTI for CG-SDT retransmission;
cg-SDT-RSRP-ThresholdSSB: an RSRP threshold configured for SSB selection for CG-SDT;
cg-RRC-RSRP-ThresholdSSB: an RSRP threshold configured for SSB selection for RACH-less handover;
periodicity: periodicity of the configured grant Type 1;
timeDomainOffset: Offset of a resource with respect to SFN=timeReferenceSFN in time domain;
timeDomainAllocation: Allocation of configured uplink grant in time domain which contains startSymbolAndLength (i.e. SLIV in TS 38.214 [7]) or startSymbol (i.e. S in TS 38.214 [7]);
nrofHARQ-Processes: the number of HARQ processes for configured grant;
harq-ProcID-Offset: offset of HARQ process for configured grant configured with cg-RetransmissionTimer for operation with shared spectrum channel access;
harq-ProcID-Offset2: offset of HARQ process for configured grant not configured with cg-RetransmissionTimer;
timeReferenceSFN: SFN used for determination of the offset of a resource in time domain. The UE uses the closest SFN with the indicated number preceding the reception of the configured grant configuration;
timeReferenceH-SFN: H-SFN used for determination of the offset of a resource in time domain. The UE uses the closest H-SFN with the indicated number preceding the reception of the configured grant configuration.

. . .

Upon configuration of a configured grant Type 1 for a BWP of a Serving Cell by upper layers, the MAC entity shall:

1> store the uplink grant provided by upper layers as a configured uplink grant for the indicated BWP of the Serving Cell;

1> initialise or re-initialise the configured uplink grant to start in the symbol according to timeDomainOffset, timeReferenceSFN, and S (derived from SLIV or provided by startSymbol as specified in TS 38.214 [7]), and to reoccur with periodicity.

If cg-SDT-PeriodicityExt (as defined in TS 38.331 [5]) is not configured, after an uplink grant is configured for a configured grant Type 1, the MAC entity shall consider sequentially that the configured uplink grant, or the first configured uplink grant in a multi-PUSCH configured grant, in the $N^{th}$ ($N \geq 0$) periodicity occurs in the symbol for which:

$$[(SFN \times numberOfSlotsPerFrame \times numberOfSymbolsPerSlot) + (\text{slot number in the frame} \times numberOfSymbolsPerSlot) + \text{symbol number in the slot}] = (timeReferenceSFN \times numberOfSlotsPerFrame \times numberOfSymbolsPerSlot + timeDomainOffset \times numberOfSymbolsPerSlot + S + N \times \text{periodicity}) \text{ modulo } (1024 \times numberOfSlotsPerFrame \times numberOfSymbolsPerSlot)$$

If cg-SDT-PeriodicityExt (as defined in TS 38.331 [5]) is configured, after an uplink grant is configured for a configured grant Type 1, the MAC entity shall consider sequentially that the configured uplink grant, or the first configured uplink grant in a multi-PUSCH configured grant, in the $N^{th}$ ($N \geq 0$) periodicity occurs in the symbol for which:

$$\left[(H\text{-}SFN \times numberOfSFNperH\text{-}SFN + SFN) \times numberOfSlotsPerFrame \times numberOfSymbolsPerSlot + (\text{slot number in the frame} \times numberOfSymbolsPerSlot) + \text{symbol number in the slot}\right] = \left((timeReferenceH\text{-}SFN \times numberOfSFNperH\text{-}SFN + timeReferenceSFN) \times numberOfSlotsPerFrame \times numberOfSymbolsPerSlot + timeDomainOffset \times numberOfSymbolsPerSlot + S + N \times \text{periodicity}\right) \text{ modulo } (1024 \times 1024 \times numberOfSlotsPerFrame \times numberOfSymbolsPerSlot)$$

For a multi-PUSCH configured grant Type 1, the $M^{th}$ ($1 < M \leq$ nrofSlotsInCG-Period) configured uplink grant within a periodicity occurs $(M-1) \times$ numberOfSymbolsPerSlot symbols after the symbol in which the first configured uplink grant in that periodicity occurs.

. . .

5.12 MAC Reset

If a reset of the MAC entity is requested by upper layers upon receiving RRCResume or RRCSetup, the MAC entity shall:

1> stop the MBS multicast DRX timers;

1> flush the soft buffers for all DL HARQ processes used for MBS multicast;

1> for each DL HARQ process used for MBS multicast, consider the next received transmission for a TB as the very first transmission.

Otherwise, if a reset of the MAC entity is requested by upper layers or the reset of the MAC entity is triggered due to SCG deactivation as defined in clause 5.29, the MAC entity shall:

1> if the MAC reset is not due to SCG deactivation:

2> initialize Bj for each logical channel to zero;

1> initialize SBj for each logical channel to zero if Sidelink resource allocation mode 1 is configured by RRC;

1> if upper layers indicate SCG deactivation and bfd-and-RLM with value true is configured for the deactivated SCG:

2> stop (if running) all timers except beamFailureDetectionTimer associated with PSCell and timeAlignmentTimers.

1> else:

2> stop (if running) all timers, except MBS broadcast DRX timers;

2> consider all timeAlignmentTimers, inactivePosSRS-TimeAlignmentTimer, and cg-SDT-TimeAlignmentTimer, if configured, as expired and perform the corresponding actions in clause 5.2;

1> set the NDIs for all uplink HARQ processes to the value 0;

1> sets the NDIs for all HARQ process IDs to the value 0 for monitoring PDCCH in Sidelink resource allocation mode 1;

1> stop, if any, ongoing Random Access procedure;

1> discard explicitly signalled contention-free Random Access Resources for 4-step RA type and 2-step RA type, if any;

1> flush Msg3 buffer;

1> flush MSGA buffer;

1> cancel, if any, triggered Scheduling Request procedure;

1> cancel, if any, triggered Buffer Status Reporting procedure;

1> cancel, if any, triggered Delay Status Reporting procedure;

1> cancel, if any, triggered Power Headroom Reporting procedure;

1> cancel, if any, triggered consistent LBT failure;

1> cancel, if any, triggered Sidelink consistent LBT failure;

1> cancel, if any, triggered BFR;

1> cancel, if any, triggered Sidelink Buffer Status Reporting procedure;

1> cancel, if any, triggered Pre-emptive Buffer Status Reporting procedure;

1> cancel, if any, triggered Timing Advance Reporting procedure;

1> cancel, if any, triggered Recommended bit rate query procedure;

1> cancel, if any, triggered Configured uplink grant confirmation;

1> cancel, if any, triggered configured sidelink grant confirmation;

1> clear, if any, configured sidelink grants;

1> cancel, if any, triggered Desired Guard Symbol query;

1> cancel, if any, triggered Positioning Measurement Gap Activation/Deactivation Request procedure;

1> cancel, if any, triggered SDT procedure;

1> cancel, if any, triggered IAB-MT Recommended Beam Indication query;

1> cancel, if any, triggered Desired DL TX Power Adjustment query;

1> cancel, if any, triggered Desired IAB-MT PSD range query;

1> cancel, if any, triggered Case-6 Timing Request query;

1> cancel, if any, triggered SL-PRS resource request;

1> flush the soft buffers for all DL HARQ processes, except for the DL HARQ process being used for MBS broadcast;

1> for each DL HARQ process, except for the DL HARQ process being used for MBS broadcast, consider the next received transmission for a TB as the very first transmission;

1> release, if any, Temporary C-RNTI;

1> clear, if any, Differential Koffset;

1> if upper layers indicate SCG deactivation and bfd-and-RLM with value true is not configured; or 1> if the MAC reset is not due to SCG deactivation:

2> reset all BFI_COUNTERS;

1> reset all LBT_COUNTERs.

Quotation End

In 38.331 ([4] 3GPP 38.331 v18.3.0), measurement report triggering, reporting, and configured grant configuration are introduced:

5.5.4 Measurement Report Triggering 5.5.4.1 General

If AS security has been activated successfully, the UE shall:

1> for each measId included in the measIdList within VarMeasConfig:

2> if the corresponding reportConfig includes a reportType set to eventTriggered or periodical:

3> if the corresponding measObject concerns NR:

4> if the corresponding reportConfig includes measRSSI-ReportConfig:

5> consider the resource indicated by the rmtc-Config on the associated frequency to be applicable;

4> if the eventA1 or eventA2 is configured in the corresponding reportConfig:

5> consider only the serving cell to be applicable;

4> if the eventA3 or eventA5 is configured in the corresponding reportConfig:

5> if a serving cell is associated with a measObjectNR and neighbours are associated with another measObjectNR, consider any serving cell associated with the other measObjectNR to be a neighbouring cell as well;

. . .

2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):

3> initiate the measurement reporting procedure, as specified in 5.5.5;

2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):

3> set the numberOfReportsSent defined within the VarMeasReportList for this measId to 0;

3> include the concerned cell(s) in the cellsTriggeredList defined within the VarMeasReportList for this measId;

3> if useT312 is set to true in reportConfig for this event:

4> if T310 for the corresponding SpCell is running; and

4> if T312 is not running for corresponding SpCell:

5> start timer T312 for the corresponding SpCell with the value of T312 configured in the corresponding measObjectNR;

3> initiate the measurement reporting procedure, as specified in 5.5.5;

. . .

2> upon expiry of the periodical reporting timer for this measId:

3> initiate the measurement reporting procedure, as specified in 5.5.5.

. . .

MAC-CellGroupConfig

The IE MAC-CellGroupConfig is used to configure MAC parameters for a cell group, including DRX.

MAC-CellGroupConfig information element

```
MAC-CellGroupConfig ::=            SEQUENCE {
    drx-Config                         SetupRelease { DRX-Config }
OPTIONAL,   -- Need M
    schedulingRequestConfig            SchedulingRequestConfig
OPTIONAL,   -- Need M
    bsr-Config                         BSR-Config
OPTIONAL,   -- Need M
    tag-Config                         TAG-Config
OPTIONAL,   -- Need M
    ...
```

SchedulingRequestConfig

The IE SchedulingRequestConfig is used to configure the parameters, for the dedicated scheduling request (SR) resources.

SchedulingRequestConfig information element

```
SchedulingRequestConfig ::=             SEQUENCE {
  schedulingRequestToAddModList           SEQUENCE (SIZE (1..maxNrofSR-ConfigPerCellGroup)) OF
SchedulingRequestToAddMod
OPTIONAL,   -- Need N
  schedulingRequestToReleaseList          SEQUENCE (SIZE (1..maxNrofSR-ConfigPerCellGroup)) OF
SchedulingRequestId
OPTIONAL    -- Need N
}
```

-continued

SchedulingRequestConfig information element

```
SchedulingRequestToAddMod ::=                SEQUENCE {
   schedulingRequestId                          SchedulingRequestId,
   sr-ProhibitTimer                             ENUMERATED {ms1, ms2, ms4, ms8, ms16, ms32, ms64, ms128}
OPTIONAL,   -- Need S
   sr-TransMax                                  ENUMERATED { n4, n8, n16, n32, n64, spare3, spare2, spare1}
}
SchedulingRequestConfig-v1700 ::=              SEQUENCE {
   schedulingRequestToAddModListExt-v1700          SEQUENCE (SIZE (1..maxNrofSR-ConfigPerCellGroup)) OF
SchedulingRequestToAddModExt-v1700
OPTIONAL   -- Need N
}
SchedulingRequestToAddModExt-v1700 ::=         SEQUENCE {
   sr-ProhibitTimer-v1700                          ENUMERATED { ms192, ms256, ms320, ms384, ms448, ms512,
ms576, ms640, ms1082, spare7, spare6, spare5, spare4, spare3, spare2, spare1}
OPTIONAL   -- Need R
}
```

| SchedulingRequestConfig field descriptions |
|---|
| schedulingRequestToAddModList, schedulingRequestToAddModListExt<br>List of Scheduling Request configurations to add or modify. If schedulingRequestToAddModListExt is configured, it contains the same number of entries, and in the same order, as schedulingRequestToAddModList.<br>schedulingRequestToReleaseList<br>List of Scheduling Request configurations to release. |

| SchedulingRequestToAddMod field descriptions |
|---|
| schedulingRequestId<br>Used to modify a SR configuration and to indicate, in LogicalChannelConfig, the SR configuration to which a logical channel is mapped and to indicate, in SchedulingRequestresourceConfig, the SR configuration for which a scheduling request resource is used.<br>sr-ProhibitTimer |

-continued

| SchedulingRequestToAddMod field descriptions |
|---|
| Timer for SR transmission on PUCCH in TS 38.321 [3]. Value is in ms. Value ms1 corresponds to 1ms, value ms2 corresponds to 2ms, and so on. If sr-ProhibitTimer-v1700 is configured, UE shall ignore sr-ProhibitTimer (without suffix).<br>If both sr-ProhibitTimer (without suffix) and sr-ProhibitTimer-v1700 are absent, the UE applies the value 0.<br>sr-TransMax<br>Maximum number of SR transmissions as described in TS 38.321 [3]. Value n4 corresponds to 4, value n8 corresponds to 8, and so on. |

SchedulingRequestId

The IE SchedulingRequestId is used to identify a Scheduling Request instance in the MAC layer.

SchedulingRequestResourceConfig

The IE SchedulingRequestResourceConfig determines physical layer resources on PUCCH where the UE may send the dedicated scheduling request (D-SR) (see TS 38.213 [13], clause 9.2.4).

SchedulingRequestResourceConfig information element

```
SchedulingRequestResourceConfig ::=            SEQUENCE {
   schedulingRequestResourceId                    SchedulingRequestResourceId,
   schedulingRequestID                            SchedulingRequestId,
   periodicityAndOffset                           CHOICE {
      sym2                                           NULL,
      sym6or7                                        NULL,
      sl1                                            NULL,       -- Recurs in every slot
      sl2                                            INTEGER (0..1),
      sl4                                            INTEGER (0..3),
      sl5                                            INTEGER (0..4),
      sl8                                            INTEGER (0..7),
      sl10                                           INTEGER (0..9),
      sl16                                           INTEGER (0..15),
      sl20                                           INTEGER (0..19),
      sl40                                           INTEGER (0..39),
      sl80                                           INTEGER (0..79),
      sl160                                          INTEGER (0..159),
      sl320                                          INTEGER (0..319),
      sl640                                          INTEGER (0..639)
   }
OPTIONAL,   -- Need M
   resource                                       PUCCH-ResourceId
OPTIONAL   -- Need M
}
SchedulingRequestResourceConfigExt-v1610 ::=     SEQUENCE {
   phy-PriorityIndex-r16                            ENUMERATED {p0, p1}
OPTIONAL,   -- Need M
   ...
}
```

-continued

| SchedulingRequestResourceConfig information element | |
|---|---|
| SchedulingRequestResourceConfigExt-v1700 ::= | SEQUENCE { |
| periodicityAndOffset-r17 | CHOICE { |
| sl1280 | INTEGER (0..1279), |
| sl2560 | INTEGER (0..2559), |
| sl5120 | INTEGER (0..5119) |
| } | |
| OPTIONAL -- Need M | |
| } | |

| SchedulingRequestResourceConfig field descriptions |
|---|
| periodicityAndOffset<br>SR periodicity and offset in number of symbols or slots (see TS 38.213 [13], clause 9.2.4) The following periodicities may be configured depending on the chosen subcarrier spacing:<br>SCS = 15 kHz: 2sym, 7sym, 1sl, 2sl, 4sl, 5sl, 8sl, 10sl, 16sl, 20sl, 40sl, 80sl<br>SCS = 30 kHz: 2sym, 7sym, 1sl, 2sl, 4sl, 5sl, 8sl, 10sl, 16sl, 20sl, 40sl, 80sl, 160sl<br>SCS = 60 kHz: 2sym, 7sym/6sym, 1sl, 2sl, 4sl, 8sl, 16sl, 20sl, 40sl, 80sl, 160sl, 320sl<br>SCS = 120 kHz: 2sym, 7sym, 1sl, 2sl, 4sl, 5sl, 8sl, 10sl, 16sl, 40sl, 80sl, 160sl, 320sl, 640sl<br>SCS = 480 kHz: 1sl, 2sl, 4sl, 8sl, 16sl, 40sl, 80sl, 160sl, 320sl, 640sl, 1280sl, 2560sl<br>SCS = 960 kHz: 1sl, 2sl, 4sl, 8sl, 16sl, 40sl, 80sl, 160sl, 320sl, 640sl, 1280sl, 2560sl, 5120sl<br>sym6or7 corresponds to 6 symbols if extended cyclic prefix and a SCS of 60 kHz are configured, otherwise it corresponds to 7 symbols.<br>For periodicities 2sym, 7sym and sl1 the UE assumes an offset of 0 slots.<br>If periodicityAndOffset-r17 is present, any previously configured periodicityAndOffset (without suffix) is released, and vice versa.<br>UE indicates support of the following SR periodicities in additionalSR-Periodicities (see TS 38.306, clause 4.2.6):<br>SCS = 30 kHz: 5sl<br>SCS = 120 kHz: 5sl, 10sl |
| phy-PriorityIndex<br>Indicates whether this scheduling request resource is high or low priority in PHY prioritization/multiplexing handling (see TS 38.213 [13], clause 9.2.4). Value p0 indicates low priority and value p1 indicates high priority. |
| resource<br>ID of the PUCCH resource in which the UE shall send the scheduling request. The actual PUCCH-Resource is configured in PUCCH-Config of the same UL BWP and serving cell as this SchedulingRequestResourceConfig. The network configures a PUCCH-Resource of PUCCH-format0 or PUCCH-format1 (other formats not supported) (see TS 38.213 [13], clause 9.2.4) |
| schedulingRequestID<br>The ID of the SchedulingRequestConfig that uses this scheduling request resource. |

TAG-Config

The IE TAG-Config is used to configure parameters for a time-alignment group.

| TAG-Config information element | |
|---|---|
| TAG-Config ::= | SEQUENCE { |
| tag-ToReleaseList | SEQUENCE (SIZE (1..maxNrofTAGs)) OF TAG-Id |
| OPTIONAL, -- Need N | |
| tag-ToAddModList | SEQUENCE (SIZE (1..maxNrofTAGs)) OF TAG |
| OPTIONAL -- Need N | |
| } | |
| TAG ::= | SEQUENCE { |
| tag-Id | TAG-Id, |
| timeAlignmentTimer | TimeAlignmentTimer, |
| ... | |
| } | |
| TAG-Id ::= | INTEGER (0..maxNrofTAGs−1) |

| TAG field descriptions |
|---|
| tag-Id<br>Indicates the TAG of the SpCell or an SCell, see TS 38.321 [3]. Uniquely identifies the TAG within the scope of a Cell Group (i.e. MCG or SCG). |
| timeAlignmentTimer<br>The timeAlignmentTimer for TAG with ID tag-Id, as specified in TS 38.321 [3]. |

CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

CSI-ReportConfig information element

```
CSI-ReportConfig ::=                    SEQUENCE {
  reportConfigId                          CSI-ReportConfigId,
  carrier                                 ServCellIndex          OPTIONAL,   -- Need S
  resourcesForChannelMeasurement          CSI-ResourceConfigId,
  csi-IM-ResourcesForInterference         CSI-ResourceConfigId   OPTIONAL,   -- Need R
  nzp-CSI-RS-ResourcesForInterference     CSI-ResourceConfigId   OPTIONAL,   -- Need R
  reportConfigType                        CHOICE {
    periodic                                SEQUENCE {
      reportSlotConfig                        CSI-ReportPeriodicityAndOffset,
      pucch-CSI-ResourceList                  SEQUENCE (SIZE (1..maxNrofBWPs)) OF PUCCH-CSI-
Resource
    },
    semiPersistentOnPUCCH                   SEQUENCE {
      reportSlotConfig                        CSI-ReportPeriodicityAndOffset,
      pucch-CSI-ResourceList                  SEQUENCE (SIZE (1..maxNrofBWPs)) OF PUCCH-CSI-
Resource
    },
    semiPersistentOnPUSCH                   SEQUENCE {
      reportSlotConfig                        ENUMERATED {sl5, sl10, sl20, sl40, sl80, sl160,
sl320},
      reportSlotOffsetList                  SEQUENCE (SIZE (1.. maxNrofUL-Allocations)) OF
INTEGER(0..32),
      p0alpha                                 P0-PUSCH-AlphaSetId
    },
    aperiodic                               SEQUENCE {
      reportSlotOffsetList                  SEQUENCE (SIZE (1..maxNrofUL-Allocations)) OF
INTEGER(0..32)
    }
  },
  reportQuantity                          CHOICE {
    none                                    NULL,
    cri-RI-PMI-CQI                          NULL,
    cri-RI-i1                               NULL,
    cri-RI-i1-CQI                           SEQUENCE {
      pdsch-BundleSizeForCSI                  ENUMERATED {n2, n4}
OPTIONAL    -- Need S
    },
    cri-RI-CQI                              NULL,
    cri-RSRP                                NULL,
    ssb-Index-RSRP                          NULL,
    cri-RI-LI-PMI-CQI                       NULL
  },
  }
OPTIONAL,   -- Need R
...
  semiPersistentOnPUSCH-v1530             SEQUENCE {
    reportSlotConfig-v1530                  ENUMERATED {sl4, sl8, sl16}
  }
OPTIONAL    -- Need R
  ]],
  [[
  semiPersistentOnPUSCH-v1610             SEQUENCE {
    reportSlotOffsetListDCI-0-2-r16         SEQUENCE (SIZE (1.. maxNrofUL-Allocations-r16)) OF
INTEGER(0..32) OPTIONAL,   -- Need R
    reportSlotOffsetListDCI-0-1-r16         SEQUENCE (SIZE (1.. maxNrofUL-Allocations-r16)) OF
INTEGER(0..32) OPTIONAL    -- Need R
  }
OPTIONAL,   -- Need R
  aperiodic-v1610                         SEQUENCE {
    reportSlotOffsetListDCI-0-2-r16         SEQUENCE (SIZE (1.. maxNrofUL-Allocations-r16)) OF
INTEGER(0..32) OPTIONAL,   -- Need R
    reportSlotOffsetListDCI-0-1-r16         SEQUENCE (SIZE (1.. maxNrofUL-Allocations-r16)) OF
INTEGER(0..32) OPTIONAL    -- Need R
  }
OPTIONAL,   -- Need R
  reportQuantity-r17                      CHOICE {
    cri-RSRP-Index-r17                      NULL,
```

-continued

CSI-ReportConfig information element

```
      ssb-Index-RSRP-Index-r17                NULL,
      cri-SINR-Index-r17                      NULL,
      ssb-Index-SINR-Index-r17                NULL
   }
OPTIONAL    -- Need R
   ]],
   [[
   semiPersistentOnPUSCH-v1720              SEQUENCE {
      reportSlotOffsetList-r17                SEQUENCE (SIZE (1.. maxNrofUL-Allocations-r16)) OF
INTEGER(0..128) OPTIONAL,   -- Need R
      reportSlotOffsetListDCI-0-2-r17         SEQUENCE (SIZE (1.. maxNrofUL-Allocations-r16)) OF
INTEGER(0..128) OPTIONAL,   -- Need R
      reportSlotOffsetListDCI-0-1-r17         SEQUENCE (SIZE (1.. maxNrofUL-Allocations-r16)) OF
INTEGER(0..128) OPTIONAL    -- Need R
   }
OPTIONAL,   -- Need R
   aperiodic-v1720                          SEQUENCE {
      reportSlotOffsetList-r17                SEQUENCE (SIZE (1.. maxNrofUL-Allocations-r16)) OF
INTEGER(0..128) OPTIONAL,   -- Need R
      reportSlotOffsetListDCI-0-2-r17         SEQUENCE (SIZE (1.. maxNrofUL-Allocations-r16)) OF
INTEGER(0..128) OPTIONAL,   -- Need R
      reportSlotOffsetListDCI-0-1-r17         SEQUENCE (SIZE (1.. maxNrofUL-Allocations-r16)) OF
INTEGER(0..128) OPTIONAL    -- Need R
   }
OPTIONAL    -- Need R
   ]],
   [[
   codebookConfig-v1730                     CodebookConfig-v1730
OPTIONAL    -- Need R
   ]]
}
CSI-ReportPeriodicityAndOffset ::=        CHOICE {
   slots4                                   INTEGER(0..3),
   slots5                                   INTEGER(0..4),
   slots8                                   INTEGER(0..7),
   slots10                                  INTEGER(0..9),
   slots16                                  INTEGER(0..15),
   slots20                                  INTEGER(0..19),
   slots40                                  INTEGER(0..39),
   slots80                                  INTEGER(0..79),
   slots160                                 INTEGER(0..159),
   slots320                                 INTEGER(0..319)
}
PUCCH-CSI-Resource ::=                    SEQUENCE {
   uplinkBandwidthPartId                    BWP-Id,
   pucch-Resource                           PUCCH-ResourceId
}
```

| CSI-ReportConfig field descriptions |
|---|
| carrier<br>Indicates in which serving cell the CSI-ResourceConfig indicated below are to be found. If the field is absent, the resources are on the same serving cell as this report configuration.<br>groupBasedBeamReporting<br>Turning on/off group beam based reporting (see TS 38.214 [19], clause 5.2.1.4). If groupBasedBeamReporting (without suffix) is set to disabled, groupBasedBeamReporting-v1710 is absent.<br>nrofReportedGroups<br>Number of reported resource groups per CSI-report. Value n1 means one resource group, n2 means 2 resource groups, and so on. If nrofReportedGroups is configured, the UE ignores groupBasedBeamReporting (without suffix).<br>nrofReportedRS<br>The number (N) of measured RS resources to be reported per report setting in a non-group-based report. N <= N_max, where N_max is either 2 or 4 depending on UE capability.<br>(see TS 38.214 [19], clause 5.2.1.4) When the field is absent the UE applies the value 1.<br>nzp-CSI-RS-ResourcesForinterference<br>NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement. |

-continued

| CSI-ReportConfig field descriptions |
|---|
| pucch-CSI-ResourceList<br>Indicates which PUCCH resource to use for reporting on PUCCH.<br>reportConfigType<br>Time domain behavior of reporting configuration.<br>reportFreqConfiguration<br>Reporting configuration in the frequency domain. (see TS 38.214 [19], clause 5.2.1.4).<br>reportQuantity<br>The CSI related quantities to report. see TS 38.214 [19], clause 5.2.1. If the field reportQuantity-r16 or reportQuantity-r17 is present, UE shall ignore reportQuantity (without suffix). Network does not configure reportQuantity-r17 together with reportQuantity-r16.<br>reportSlotConfig<br>Periodicity and slot offset (see TS 38.214 [19], clause 5.2.1.4). If the field reportSlotConfig-v1530 is present, the UE shall ignore the value provided in reportSlotConfig (without suffix).<br>reportSlotOffsetList, reportSlotOffsetListDCI-0-1, reportSlotOffsetListDCI-0-2<br>Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity.<br>Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 6.1.2.1).<br>The field reportSlotOffsetListDCI-0-1 applies to DCI format 0_1 and the field reportSlotOffsetListDCI-0-2 applies to DCI format 0_2 (see TS 38.214 [19], clause 6.1.2.1).<br>....<br>resourcesForChannelMeasurement<br>Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig. |

| PUCCH-CSI-Resource field descriptions |
|---|
| pucch-Resource<br>PUCCH resource for the associated uplink BWP. Only PUCCH-Resource of format 2, 3 and 4 is supported. The actual PUCCH-Resource is configured in PUCCH-Config and referred to by its ID. When two PUCCH-Config are configured within PUCCH-ConfigurationList, PUCCH-ResourceId in a PUCCH-CSI-Resource refers to a PUCCH-Resource in the PUCCH-Config used for HARQ-ACK with low priority. |

BWP-UplinkDedicated

The IE BWP-Uplink Dedicated is used to configure the dedicated (UE specific) parameters of an uplink BWP.

BWP-UplinkDedicated information element

```
BWP-UplinkDedicated ::=                    SEQUENCE {
  pucch-Config                               SetupRelease { PUCCH-Config }
OPTIONAL,   -- Need M
  pusch-Config                               SetupRelease { PUSCH-Config }
OPTIONAL,   -- Need M
  configuredGrantConfig                      SetupRelease { ConfiguredGrantConfig }
OPTIONAL,   -- Need M
...
  pucch-ConfigurationList-r16                SetupRelease { PUCCH-ConfigurationList-r16 }
OPTIONAL,   -- Need M
  lbt-FailureRecoveryConfig-r16              SetupRelease { LBT-FailureRecoveryConfig-r16 }
OPTIONAL,   -- Need M
  configuredGrantConfigToAddModList-r16          ConfiguredGrantConfigToAddModList-r16
OPTIONAL,   -- Need N
  configuredGrantConfigToReleaseList-r16         ConfiguredGrantConfigToReleaseList-r16
OPTIONAL,   -- Need N
  configuredGrantConfigType2DeactivationStateList-r16
ConfiguredGrantConfigType2DeactivationStateList-r16      OPTIONAL   -- Need R
  ]],
  [[
  ul-TCI-StateList-r17                       CHOICE {
    explicitlist                               SEQUENCE {
      ul-TCI-ToAddModList-r17                    SEQUENCE (SIZE (1..maxUL-TCI-r17)) OF TCI-UL-State-
r17      OPTIONAL,   -- Need N
      ul-TCI-ToReleaseList-r17                   SEQUENCE (SIZE (1..maxUL-TCI-r17)) OF TCI-UL-StateId-
r17   OPTIONAL   -- Need N
```

-continued

BWP-UplinkDedicated information element

```
    },
    unifiedTCI-StateRef-r17                        ServingCellAndBWP-Id-r17
  }
OPTIONAL, -- Need R
```

ul-TCI-StateList
Indicates the applicable UL TCI states for PUCCH, PUSCH and SRS.
ul-TCI-ToAddModList
Indicates a list of UL TCI states.

TCI-State

The IE TCI-State associates one or two DL reference signals with a corresponding quasi-colocation (QCL) type.

TCI-State information element

```
TCI-State ::=                    SEQUENCE {
  tci-StateId                      TCI-StateId,
  qcl-Type1                        QCL-Info,
  qcl-Type2                        QCL-Info
OPTIONAL,   -- Need R
  ...,
  [[
  additionalPCI-r17                AdditionalPCIIndex-r17
OPTIONAL,   -- Need R
  pathlossReferenceRS-Id-r17       PathlossReferenceRS-Id-r17
OPTIONAL,   -- Cond JointTCI1
  ul-powerControl-r17              Uplink-powerControlId-r17
OPTIONAL    -- Cond JointTCI
  ]]
}
QCL-Info ::=                     SEQUENCE {
  cell                             ServCellIndex
OPTIONAL,   -- Need R
  bwp-Id                           BWP-Id
OPTIONAL, -- Cond CSI-RS-Indicated
  referenceSignal                  CHOICE {
    csi-rs                           NZP-CSI-RS-ResourceId,
    ssb                              SSB-Index
  },
  qcl-Type                         ENUMERATED {typeA, typeB, typeC, typeD},
  ...
}
```

QCL-Info field descriptions bwp-Id
The DL BWP which the RS is located in. If the field is absent, the RS is located in the DL BWP in which the TCI-State is applied by the UE.
cell
The UE's serving cell in which the referenceSignal is configured. If the field is absent, it applies to the serving cell in which the TCI-State is applied by the UE. The RS can be located on a serving cell other than the serving cell for which the TCI-State is applied by the UE only if the qcl-Type is configured as typeC or typeD. If the referenceSignal is set to csi-rs and unifiedTCI-StateType is configured, either both cell and bwp-Id are present or both cell and bwp-Id are absent. See TS 38.214 [19] clause 5.1.5.
referenceSignal
Reference signal with which quasi-collocation information is provided as specified in TS 38.214 [19] clause 5.1.5.
qcl-Type
QCL type as specified in TS 38.214 [19] clause 5.1.5.

| TCI-State field descriptions |
|---|
| additionalPCI<br>Indicates the physical cell IDs (PCI) of the SSBs when referenceSignal is configured as SSB for both QCL-Type1 and QCL-Type2. In case the cell is present, the additionalPCI refers to a PCI value configured in the list configured using additionalPCI-ToAddModList in the serving cell indicated by the field cell. Otherwise, it refers to a PCI value configured in a list additionalPCI-ToAddModList configured in the serving cell where the TCI-State is applied by the UE. When this field is present the cell for qcl-Type1 and qcl-Type2 is configured with same value, if present. |
| pathlossReferenceRS-Id<br>The ID of the reference signal (e.g. a CSI-RS or an SS block) used for PUSCH, PUCCH and SRS path loss estimation. This field refers to an element in the list configured using pathlossReferenceRSToAddModList in the serving cell and UL BWP where the TCI State is applied by the UE. |
| qcl-Type1, qcl-Type2<br>QCL information for the TCI state as specified in TS 38.214 [19] clause 5.1.5. |
| tci-StateId<br>ID number of the TCI state. |
| ul-PowerControl<br>Configures power control parameters for PUCCH, PUSCH and SRS for this TCI state. The field is present here only if ul-powerControl is not configured in any BWP-Uplink-Dedicated of this serving cell. This field refers to an element in the list configured using uplink-PowerControlToAddModList in the serving cell where the dl-OrJointTCI-StateToAddModList is configured. |

TCI-StateId

The IE TCI-StateId is used to identify one TI-State configuration.

TCI-UL-State

The IE TCI-UL-State indicates the TCI state information for UL transmission.

TCI-UL-State information element

```
TCI-UL-State-r17 ::=              SEQUENCE {
   tci-UL-StateId-r17               TCI-UL-StateId-r17,
   servingCellId-r17                  ServCellIndex                  OPTIONAL,
-- Need R
   bwp-Id-r17                         BWP-Id                         OPTIONAL,
-- Cond CSI-RSorSRS-Indicated
   referenceSignal-r17                CHOICE {
      ssb-Index-r17                      SSB-Index,
      csi-RS-Inex-r17                    NZP-CSI-RS-ResourceId,
      srs-r17                            SRS-ResourceId
   },
   additionalPCI-r17                  AdditionalPCIIndex-r17         OPTIONAL,
-- Need R
   ul-powerControl-r17                Uplink-powerControlId-r17      OPTIONAL,
-- Need R
   pathlossReferenceRS-Id-r17         PathlossReferenceRS-Id-r17     OPTIONAL,
-- Cond Mandatory
   ...
}
```

| TCI-UL-State field descriptions |
|---|
| additionalPCI<br>Indicates the physical cell IDs (PCI) of the SSBs when referenceSignal is configured as SSB. In case the servingCellId is present, the additionalPCI refers to a PCI value configured in the list configured using additionalPCI-ToAddModList in the serving cell indicated by the field servingCellId. Otherwise, it refers to a PCI value configured in the list configured using additionalPCI-ToAddModList in the serving cell where the ul-TCI-StateList is applied by the UE. |
| bwp-Id<br>The DL BWP which the CSI-RS is located in or UL BWP where the SRS is located in. |
| servingCellId<br>The UE's serving cell in which the referenceSignal is configured. If the field is absent, it applies to the serving cell in which the TCI-UL-State is applied by the UE. |
| pathlossReferenceRS-Id<br>The ID of the reference Signal (e.g. a CSI-RS or a SS block) used for PUSCH, PUCCH and SRS path loss estimation. This field refers to an element in the list configured using pathlossReferenceRSToAddModList in the serving cell and UL BWP where the UL TCI State is applied by the UE. |
| ul-powerControl<br>Configures power control parameters for PUCCH, PUSCH and SRS for this TCI state. The field is present here only if ul-powerControl is not configured in any BWP-Uplink-Dedicated of this serving cell. This field refers to an element in the list configured using uplink-PowerControlToAddModList in the serving cell where the ul-TCI-ToAddModList is configured. |

TCI-UL-StateId

The IE TCI-UL-StateId is used to identify one TCI-UL-State configuration.

6.3.2 Radio Resource Control Information Elements

. . .

ReportConfigNR

The IE ReportConfigNR specifies criteria for triggering of an NR measurement reporting event or of a CHO, CPA or CPC event or of an L2 U2N relay measurement reporting event. For events labelled AN with N equal to 1, 2 and so on, measurement reporting events and CHO, CPA or CPC events are based on cell measurement results, which can either be derived based on SS/PBCH block or CSI-RS.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell;

ReportConfigNR information element

```
ReportConfigNR ::=                  SEQUENCE {
  reportType                          CHOICE {
      periodical                          PeriodicalReportConfig,
      eventTriggered                      EventTriggerConfig,
      ...,
      reportCGI                           ReportCGI,
      reportSFTD                          ReportSFTD-NR,
      condTriggerConfig-r16               CondTriggerConfig-r16,
      cli-Periodical-r16                  CLI-PeriodicalReportConfig-r16,
      cli-EventTriggered-r16              CLI-EventTriggerConfig-r16,
      rxTxPeriodical-r17                  RxTxPeriodical-r17,
      reportOnScellActiviation-r18        ReportOnScellActivation-r18
  }
}
...
EventTriggerConfig ::=              SEQUENCE {
  eventId                             CHOICE {
      eventA1                             SEQUENCE {
        a1-Threshold                        MeasTriggerQuantity,
        reportOnLeave                       BOOLEAN,
        hysteresis                          Hysteresis,
        timeToTrigger                       TimeToTrigger
      },
      eventA2                             SEQUENCE {
        a2-Threshold                        MeasTriggerQuantity,
        reportOnLeave                       BOOLEAN,
        hysteresis                          Hysteresis,
        timeToTrigger                       TimeToTrigger
      },
      eventA3                             SEQUENCE {
        a3-Offset                           MeasTriggerQuantityOffset,
        reportOnLeave                       BOOLEAN,
        hysteresis                          Hysteresis,
        timeToTrigger                       TimeToTrigger
        useAllowedCellList                  BOOLEAN
      },
      eventA4                             SEQUENCE {
        a4-Threshold                        MeasTriggerQuantity,
        reportOnLeave                       BOOLEAN,
        hysteresis                          Hysteresis,
        timeToTrigger                       TimeToTrigger
        useAllowedCellList                  BOOLEAN
      },
      eventA5                             SEQUENCE {
        a5-Threshold1                       MeasTriggerQuantity,
        a5-Threshold2                       MeasTriggerQuantity,
        reportOnLeave                       BOOLEAN,
        hysteresis                          Hysteresis,
        timeToTrigger                       TimeToTrigger
        useAllowedCellList                  BOOLEAN
      },
      eventA6                             SEQUENCE {
        a6-Offset                           MeasTriggerQuantityOffset,
        reportOnLeave                       BOOLEAN,
```

-continued

ReportConfigNR information element

```
            hysteresis                          Hysteresis,
            timeToTrigger                       TimeToTrigger,
            useAllowedCellList                  BOOLEAN
         },
         ...,
      ...
   },
   rsType                                   NR-RS-Type,
   reportInterval                           ReportInterval,
   reportAmount                             ENUMERATED {r1, r2, r4, r8, r16, r32, r64, infinity},
   reportQuantityCell                       MeasReportQuantity,
   maxReportCells                           INTEGER (1..maxCellReport),
   reportQuantityRS-Indexes                  MeasReportQuantity
OPTIONAL,   -- Need R
   maxNrofRS-IndexesToReport                INTEGER (1..maxNrofIndexesToReport)
OPTIONAL,   -- Need R
   includeBeamMeasurements                  BOOLEAN,
   reportAddNeighMeas                       ENUMERATED {setup}
OPTIONAL,   -- Need R
   ...,
   [[
...
NR-RS-Type ::=                            ENUMERATED {ssb, csi-rs}
MeasTriggerQuantity ::=                   CHOICE {
   rsrp                                     RSRP-Range,
   rsrq                                     RSRQ-Range,
   sinr                                     SINR-Range
}
MeasTriggerQuantityOffset ::=             CHOICE {
   rsrp                                     INTEGER (-30..30),
   rsrq                                     INTEGER (-30..30),
   sinr                                     INTEGER (-30..30)
}
MeasReportQuantity ::=                    SEQUENCE {
   rsrp                                     BOOLEAN,
   rsrq                                     BOOLEAN,
   sinr                                     BOOLEAN
}
MeasRSSI-ReportConfig-r16 ::=             SEQUENCE {
   channelOccupancyThreshold-r16            RSSI-Range-r16      OPTIONAL -- Need R
}
```

| ReportConfigNR field descriptions |
|---|
| reportType<br>Type of the configured measurement report. In MR-DC, network does not configure report of type reportCGI using SRB3. The condTriggerConfig is used for CHO, CPA or CPC configuration. |

| EventTriggerConfig field descriptions |
|---|
| ....<br>eventId<br>Choice of NR event triggered reporting criteria.<br>maxReportCells<br>Max number of non-serving cells to include in the measurement report.<br>numberOfTriggeringCells<br>Indicates the number of cells detected that are required to fulfill an event for a measurement report to be triggered. This field is applicable only for the events concerning neighbor cells, i.e. eventA3, eventA4, eventA5, eventA3H1, eventA3H2, eventA4H1, eventA4H2, eventA5H1, eventA5H2.<br>reportAmount<br>Number of measurement reports applicable for eventTriggered as well as for periodical report types.<br>reportOnLeave<br>Indicates whether or not the UE shall initiate the measurement reporting procedure when the leaving condition is met for a cell in cellsTriggeredList, as specified in 5.5.4.1.<br>Indicates whether or not the UE shall initiate the measurement reporting procedure when the leaving condition is met if configured in eventD1, eventD2, eventH1, eventH2 as specified in 5.5.4.1.<br>reportQuantityCell<br>The cell measurement quantities to be included in the measurement report.<br>timeToTrigger<br>Time during which specific criteria for the event needs to be met in order to trigger a measurement report. |

ConfiguredGrantConfig

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

ConfiguredGrantConfig information element

```
ConfiguredGrantConfig ::=                    SEQUENCE {
   frequencyHopping                            ENUMERATED {intraSlot, interSlot}
OPTIONAL,   -- Need S
   cg-DMRS-Configuration                       DMRS-UplinkConfig,
   mcs-Table                                   ENUMERATED {qam256, qam64LowSE}
OPTIONAL,   -- Need S
   mcs-TableTransformPrecoder                  ENUMERATED {qam256, qam64LowSE}
OPTIONAL,   -- Need S
   uci-OnPUSCH                                 SetupRelease { CG-UCI-OnPUSCH }
OPTIONAL,   -- Need M
   resourceAllocation                          ENUMERATED { resourceAllocationType0,
resourceAllocationType1, dynamicSwitch },
   rbg-Size                                    ENUMERATED {config2}
OPTIONAL,   -- Need S
   powerControlLoopToUse                       ENUMERATED {n0, n1},
   p0-PUSCH-Alpha                              P0-PUSCH-AlphaSetId,
   transformPrecoder                           ENUMERATED {enabled, disabled}
OPTIONAL,   -- Need S
   nrofHARQ-Processes                          INTEGER(1..16),
   repK                                        ENUMERATED {n1, n2, n4, n8},
   repK-RV                                     ENUMERATED {s1-0231, s2-0303, s3-0000}
OPTIONAL,   -- Need R
   periodicity                                 ENUMERATED {
                                                   sym2, sym7, sym1x14, sym2x14, sym4x14, sym5x14,
sym8x14, sym10x14, sym16x14, sym20x14,
                                                   sym32x14, sym40x14, sym64x14, sym80x14, sym128x14,
sym160x14, sym256x14, sym320x14, sym512x14,
                                                   sym640x14, sym1024x14, sym1280x14, sym2560x14,
sym5120x14,
                                                   sym6, sym1x12, sym2x12, sym4x12, sym5x12, sym8x12,
sym10x12, sym16x12, sym20x12, sym32x12,
                                                   sym40x12, sym64x12, sym80x12, sym128x12, sym160x12,
sym256x12, sym320x12, sym512x12, sym640x12,
                                                   sym1280x12, sym2560x12
   },
   configuredGrantTimer                        INTEGER (1..64)
OPTIONAL,   -- Need R
   rrc-ConfiguredUplinkGrant                   SEQUENCE {
      timeDomainOffset                            INTEGER (0..5119),
      timeDomainAllocation                        INTEGER (0..15),
      frequencyDomainAllocation                   BIT STRING (SIZE (18)),
      antennaPort                                 INTEGER (0..31),
      dmrs-SeqInitialization                      INTEGER (0..1)
OPTIONAL,   -- Need R
      precodingAndNumberOfLayers                  INTEGER (0..63),
      srs-ResourceIndicator                       INTEGER (0..15)
OPTIONAL,   -- Need R
      mcsAndTBS                                   INTEGER (0..31),
      frequencyHoppingOffset                      INTEGER (1.. maxNrofPhysicalResourceBlocks−1)
OPTIONAL,   -- Need R
      pathlossReferenceIndex                      INTEGER (0..maxNrofPUSCH-PathlossReferenceRSs−1),
      ...,
      [[
      pusch-RepTypeIndicator-r16                  ENUMERATED {pusch-RepTypeA,pusch-RepTypeB}
OPTIONAL,   -- Need M
      frequencyHoppingPUSCH-RepTypeB-r16          ENUMERATED {interRepetition, interSlot}
OPTIONAL,   -- Cond RepTypeB
      timeReferenceSFN-r16                        ENUMERATED {sfn512}
OPTIONAL    -- Need S
      ]],
      [[
      pathlossReferenceIndex2-r17                 INTEGER (0..maxNrofPUSCH-PathlossReferenceRSs−1)
OPTIONAL,   -- Need R
      srs-ResourceIndicator2-r17                  INTEGER (0..15)
OPTIONAL,   -- Need R
      precodingAndNumberOfLayers2-r17             INTEGER (0..63)
```

-continued

| ConfiguredGrantConfig information element | |
|---|---|
| OPTIONAL, -- Need R | |
| timeDomainAllocation-v1710 | INTEGER (16..63) |
| OPTIONAL, -- Need M | |
| timeDomainOffset-r17 | INTEGER (0..40959) |
| OPTIONAL, -- Need R | |
| ...OPTIONAL -- Need R | |
| ]] | |
| } | |
| ... | |
| } | |

. . .

TimeToTrigger

The IE TimeToTrigger specifies the value range used for time to trigger parameter, which concerns the time during which specific criteria for the event needs to be met in order to trigger a measurement report. Value ms0 corresponds to 0 ms and behaviour as specified in 7.1.2 applies, value ms40 corresponds to 40 ms, and so on.

Quotation End

In RAN1#118 ([5] Chair notes RAN1 #118), 3GPP RAN1 progress for a UEI beam report is quoted below:

Agreement

On beam report transmission procedure for UE-initiated/event-driven beam reporting, for regarding Mode-B, the pre-configured resource(s) for the second channel in Step-2 is at least type 1 CG-PUSCH.

FFS: PUCCH as the second channel

FFS: Whether the PUSCH can be with UL data

Agreement

Regarding explicit RS configuration for new beam measurement for Event 2, at least Option-1 is supported Option-1: The RS(s) for new beam(s) are explicitly configured in one RS resource set associated with an CSI reporting configuration If legacy UE capability signaling cannot be reused, introduce a UE capability signaling of indicating the maximum number of the configured RS(s) in the RS resource set.

FFS: The RS in the RS resource set can be updated by MAC-CE

Agreement

On UE-initiated/event-driven beam reporting, regarding L1-RSRP report format Option-3 depending on Event-2, the following differential L1-RSRP report format is supported.

| |
|---|
| CRI or SSBRI #1 |
| CRI or SSBRI #2 |
| ... |
| CRI or SSBRI #N |
| L1-RSRP #1 |
| Differential L1-RSRP #2 |
| ... |
| Differential L1-RSRP #N |
| Differential L1-RSRP for current beam, if report mode that current beam is always reported is enabled by RRC |
| Note: Other contents are not precluded |

Differential L1-RSRP #2~#N/current beam is determined based on the difference between measured L1-RSRP corresponding to the CRI/SSBRI #2~#N/current beam and the measured L1-RSRP corresponding to CRI/SSBRI #1

L1-RSRP #1 is the largest measured RSRP among reported ones, and an absolute L1-RSRP.

FFS: range and step size of differential L1-RSRP

FFS: Whether/how to report additional indication of which CRI/SSBRI(s) satisfy the condition of Event-2.

FFS: Additional report content(s) (e.g., reporting configuration ID, indication for synchronization state, event ID, or cell ID).

Agreement

On beam report transmission procedure for UE-initiated/event-driven beam reporting, regarding the dedicated RRC signaling for first PUCCH channel configuration for Mode-A, down-select one of the following Alt-1 (dedicated SR for mode-A): Introduce RRC parameter, e.g., reportResourceRequest-UEIBR, corresponding to the one-bit indication in the first PUCCH channel The RRC parameter is associated with the dedicated SchedulingRequestId.

Note: The detailed signaling is up to RAN2.

Alt 2 (new UCI type): Introduce RRC parameter, e.g., firstPUCCHResourceConfig-ModeA-UEIBR, for the periodic PUCCH resource configuration.

Note: The RRC parameter is NOT associated with Scheduling RequestId.

FFS: how to encode 1-bit to PUCCH resource, e.g., reuse encoding mechanism of positive/negative SR.

The dedicated RRC parameter at least comprises the following:

periodicityAndOffset

PUCCH-ResourceID

Above applies at least for the single CC case.

Agreement

On beam report transmission procedure for UE-initiated/event-driven beam reporting, regarding the dedicated RRC signaling for first PUCCH channel configuration for Mode-B, down-select one of the following Alt 1 (dedicated SR for mode-B): Introduce RRC parameter, e.g., reportNotification-UEIBR, corresponding to the one-bit indication in the first PUCCH channel The RRC parameter is associated with the dedicated SchedulingRequestId.

Note: The detailed signaling is up to RAN2.

Alt 2 (new UCI type): Introduce RRC parameter, e.g., firstPUCCHResourceConfig-ModeB-UEIBR, for the periodic PUCCH resource configuration.

Note: The RRC parameter is NOT associated with SchedulingRequestId.

FFS: how to encode 1-bit to PUCCH resource, e.g., reuse encoding mechanism of positive/negative SR.

The dedicated RRC parameter at least comprises the following:

periodicityAndOffset
PUCCH-ResourceID

Above is at least applied to a single CC case.

Agreement

On beam report transmission procedure for UE-initiated/event-driven beam reporting, regarding the triggering procedure in Step-2 of Mode-A, select one of the following options

- Option-1: Introduce a new 1-bit field in DCI format 0_1/0_2 to trigger the transmission of the UEI beam report
  - FFS: DCI format 0_3
- Option-2: Reuse CSI request field in DCI format 0_1/0_2 to trigger the transmission of the UEI beam report
  - FFS: DCI format 0_3
- FFS: Whether/how to handle the case that multiple CSI report configuration(s) for the UE-initiated/event-driven beam report are associated with the same first PUCCH resource and/or the same scheduled PUSCH Conclusion On beam report transmission procedure for UE-initiated/event-driven beam reporting, regarding Mode-A, there is no RAN1 consensus on additionally supporting that the DCI format in Step-2 comprises DL-grant DCI format, and the second channel in Step-3 is PUCCH.

Agreement

On UE-initiated/event-driven beam reporting, regarding L1-RSRP report format Option-3 depending on Event-2, the candidate value of 'N' at least comprises {1, 2, 3, 4}

- FFS: additional candidate value(s) of {5, 6, 7, 8}
- FFS: If 'N' is not RRC configured, only one L1-RSRP and CRI/SSBRI are reported by default.

Agreement

Regarding RS measurement for the current beam for Event 2, for Option-2a, besides for scheme-1 and scheme-2, further down-select one of the following for handling the case that only one TRS is configured in the indicated TCI state in RAN1#118bis

- Option-1: Introducing additional scheme: the RS for current beam can be a CSI-RS for beam management derived from the QCL RS in the indicated TCI state;
- Option-2: Further support TRS as measurement RS of current beam for determining L1-RSRP
- Option-3: Introducing additional scheme: The RS for current beam is explicitly configured by RRC or MAC-CE (Option-2C in RAN1 116b agreement).
- Option-4: No further enhancement Agreement On beam report transmission procedure for UE-initiated/event-driven beam reporting, for the case the pre-configured Type-1 CG PUSCH carry the beam report, for the second UL channel in Mode-B, at least one or both of the following should be supported:

- Option-1: The same Type-1 CG PUSCH can carry UL-SCH and the beam report.
- Option-2: The Type-1 CG PUSCH is a dedicated type-1 CG PUSCH for carrying the beam report
  - Note: This PUSCH can NOT carry UL-SCH. This PUSCH can NOT carry any other UCI.

Agreement

On beam report transmission procedure for UE-initiated/event-driven beam reporting, regarding Mode-B, UEI beam report is carried on a first available transmission occasion of the second UL channel X symbols after sending the last symbol of report notification on the first PUCCH channel.

Agreement

On beam report transmission procedure for UE-initiated/event-driven beam reporting, regarding resource mapping/configuration between first and second channel in Mode-B, for a given CSI report configuration, the following is provided for down-selection.

- Option-1 (one-to-one): Only one first PUCCH resource and only one pre-configured resource for second UL channel can be associated with the CSI report configuration for UE-initiated/event-driven beam reporting.
  - Option-1A: Same periodicity between first PUCCH resource and pre-configured resource for second UL channel.
  - Option-1B: No restriction in terms of periodicity.
- Option-2 (one-to-M): Only one first PUCCH resource and one or more pre-configured resource(s) for second UL channel can be associated with CSI report configuration for UE-initiated/event-driven beam reporting.

Agreement

On beam report transmission procedure for UE-initiated/event-driven beam reporting, regarding Event-2, for at least Mode-B, the beam report should be carried in the second UL channel in the CC where the corresponding CSI report configuration is configured.

- Above applies to both cross-CC and same-CC beam report.
- Note: Above is applied to the case that second UL channel is PUSCH.
- FFS: Whether the first and second channels can be from the same/different CC.

Working Assumption

On UE-initiated/event-driven beam reporting, regarding trigger events, besides for Event-2, Event-1 and Event-7 are both supported.

- Event-1: Quality of the current beam is worse than a certain threshold.
- Event-7: Quality of at least one new beam, such as L1-RSRP, becomes a threshold value better than the RS derived from the activated TCI state with the M-th best quality.
  - M is RRC configured with subjective to UE capability signalling
    - UE may only indicate a single candidate value or not support Event-7.
- The additionally supported events will reuse the same design as event 2—unless there is consensus to do otherwise
- The additionally supported events will be lower priority compared to event 2.

Agreement

On beam report transmission procedure for UE-initiated/event-driven beam reporting, regarding Mode-A and/or Mode-B, further study the following for first PUCCH transmission

- UCI multiplexing/dropping/prioritization rule.
- Conditions for the transmission of the first PUCCH.
- Whether the PUCCH resource in the first PUCCH channel can be associated with multiple CSI report configurations for UE-initiated/event-driven beam reporting from one or multiple CC(s).
- Whether/how to re-transmit the first PUCCH channel.

Whether/how to apply prohibit-timer or maximum number of (re)transmission(s) for first PUCCH channel.

Quotation End

In RAN1#118bis ([6] Chair's notes RAN1 #118bis), agreement regarding a UEI report is quoted below:

Agreement

On UE-initiated/event-driven beam reporting, regarding L1-RSRP report format Option-3 depending on Event-2,

- The differential L1-RSRP is quantized to a 4-bit value with 2 dB step size

Agreement

On beam report transmission procedure for UE-initiated/event-driven beam reporting, regarding the triggering procedure in Step-2 of Mode-A

- Reuse CSI request field in DCI format 0_1/0_2 to trigger the transmission of the UEI beam report
  - If a CSI trigger state associated with UEI beam report configuration(s) is indicated by the CSI request field in DCI format 0_1/0_2, the UE transmits the corresponding UEI beam report(s) in the second PUSCH scheduled by the DCI format 0_1/0_2
  - FFS: DCI format 0_3
- FFS: Whether a CSI trigger state should be dedicated to UE-initiated/event-driven beam reporting, i.e., not associated with legacy AP-CSI report configuration.

Agreement

On beam report transmission procedure for UE-initiated/event-driven beam reporting, resource mapping/configuration between first and second UL channel in Mode-B, at least Option-1 is supported

- Option-1 (one-to-one): Only one periodic PUCCH resource for the first channel and only one pre-configured resource for second UL channel can be associated with the CSI report configuration for UE-initiated/event-driven beam reporting.
  - Down-select one of the following in RAN1#118bis
  - Option-1A: Same periodicity between first PUCCH resource and pre-configured resource for second UL channel.
  - Option-1B: No restriction in terms of periodicity.

Agreement

On cross-CC beam report transmission procedure for UE-initiated/event-driven beam reporting, regarding Event-2, for both Mode-A and Mode-B, the first PUCCH and the second PUSCH can be from the same or different CC(s)

- FFS: whether the first PUCCH and the second PUSCH should be from the same PUCCH group
- The first PUCCH and the second PUSCH should be in the same CG
  - FFS: Different CGs Agreement On beam report transmission procedure for UE-initiated/event-driven beam reporting, for the case the pre-configured Type-1 CG PUSCH carry the beam report, for the second UL channel in Mode-B, at least option3 is supported:

- Option-1: The same Type-1 CG PUSCH can carry UL-SCH, any other UCI, and the beam report.
- Option-2: The Type-1 CG PUSCH is a dedicated type-1 CG PUSCH for carrying the beam report
  - Note: This PUSCH can NOT carry UL-SCH. This PUSCH can NOT carry any other UCI.
- Option-3: The Type-1 CG PUSCH is a type-1 CG PUSCH for carrying the beam report
  - Note: This PUSCH can NOT carry UL-SCH. This PUSCH can carry any other UCI.

FFS: whether Type-1 CG PUSCH can be transmitted if the pre-configured Type-1 CG PUSCH does NOT carry the beam report Working Assumption The following working assumption in RAN1#118 is revised in red.

On UE-initiated/event-driven beam reporting, regarding trigger events, besides for Event-2, Event-1 and Event-7 are both supported.

- Event-1: Quality of the current beam is worse than a certain threshold.
- Event-7: Quality of at least one new beam, such as L1-RSRP, becomes a threshold value better than the RS derived from the activated TCI state with the Q-th best quality.
  - Q is RRC configured with subjective to UE capability signalling
    - UE may only indicate a single candidate value or not support Event-7.
- The additionally supported events will reuse the same design as event 2—unless there is consensus to do otherwise
- The additionally supported events will be lower priority compared to event 2.

Agreement

On beam report transmission procedure for UE-initiated/event-driven beam reporting, regarding resource mapping/configuration between first and second UL channel associated with a same CSI report configuration in Mode-B,

- The UE expects that there is the same periodicity (in ms) between first PUCCH resource and pre-configured resource for second UL channel.
  - FFS: Whether first PUCCH resource and pre-configured resource for second UL channel can have different periodicities (in ms)

Agreement

Regarding RS measurement for the current beam for Event 2, for Option-2a, besides for scheme-1 and scheme-2, there is no RAN1 consensus on the following enhancement for handling the case that only one TRS is configured in the indicated TCI state in RAN1#118b is

- Option-1: Introducing additional scheme: the RS for current beam can be a CSI-RS for beam management derived from the QCL RS in the indicated TCI state;
- Option-2: Further support TRS as measurement RS of current beam for determining L1-RSRP
- Option-3: Introducing additional scheme: The RS for current beam is explicitly configured by RRC or MAC-CE (Option-2C in RAN1 116b agreement).

Note 3: When only one TRS is configured in the indicated TCI state, either Scheme-1 (working assumption) or Scheme-2 is used where enabling one of either Scheme-1 or Scheme-2 is selected by NW.

When the Scheme-1 is used, the UE assumes that the CSI-RS resource in the indicated TCI state is configured in a CSI-RS resource set configured with repetition.

Agreement

Regarding RS measurement for the current beam for Event 2, for Option-2a, confirm the following working assumption

- Note 3: When only one TRS is configured in the indicated TCI state, either Scheme-1 or Scheme-2 is used where enabling one of either Scheme-1 or Scheme-2 is selected by NW.

Agreement

Regarding RS measurement for the current beam for Event 2, for Option-2a, the following working assumption in RAN1#117 is confirmed with modification:

- (Working Assumption) Enabling of either Scheme-1 or Scheme-2 should ensure the same RS type for RS measurement for current beam and new beam.
  - Note: In such case, the RS type comprises SSB and CSI-RS configured in a CSI-RS resource set configured with repetition.

Agreement

Regarding RS measurement for the current beam for Event 2, for enabling one of either Scheme-1 or Scheme-2 by NW in Option-2a, the following implicit manner is supported:

If the RS(s) for new beam are CSI-RS configured in a CSI-RS resource set configured with repetition, Scheme-1 is enabled; otherwise, Scheme-2 is enabled.

Agreement

Regarding the triggering event determination for Event 2, the event instance(s) counting is per new beam. Further study candidate condition(s) of resetting the counting including whether resetting is needed.

Agreement

Regarding the triggering event determination for Event 2, down-select among the following alternatives for the evaluation periodicity for determining Event-2 instance [at least when DRX is not configured]

Alt-1: The periodicity of the current beam RS should be the same as that of the new beam RS(s).

The evaluation periodicity is the same as the periodicity of the current and new beam RS(s)

Alt-2: The periodicity of the current beam RS can be different from that of the new beam RS(s)

Alt-2_1: The evaluation periodicity is the same as the periodicity of the current beam RS;

Alt-2_2: The evaluation periodicity is the same as periodicity of the new beam RS;

Alt-2_3: The evaluation periodicity is the same as shortest periodicity of the current beam RS and new beam RS(s):

Alt-2_4: The evaluation periodicity is the maximum of {X ms, shortest periodicity of the current beam RS and new beam RS(s)}:

Alt-2_5: The evaluation periodicity is the same as largest periodicity of the current beam RS and new beam RS(s):

Note: There is the same periodicity for the new beam RS(s).

Agreement

On cross-CC beam report transmission procedure for UE-initiated/event-driven beam reporting, regarding Event-2, the following is supported For new beam measurement, in a CSI report configuration, configure legacy RRC parameter carrier that indicates the CC that the RS resource set associated with the CSI reporting configuration can be found FFS: Whether the current beam RS and new beam RS(s) can be in the same CC or in different CCs, regarding cross-CC beam measurement.

FFS: Whether the indicated TCI state and new beam RS(s) can be in the same CC or in different CCs, regarding cross-CC beam measurement.

Quotation End

In New Radio (NR), a network could configure a User Equipment (UE) with beam reporting (e.g., periodic or semi-persistent beam reporting) or activate or trigger aperiodic beam reporting (e.g., Channel State Information (CSI) reporting) to acquire or obtain channel state information or channel quality or beam quality for data/control transmissions. However, with frequent reporting, the UE could experience huge transmission/signaling overhead. On the other hand, with sparse reporting, the network may not be able to obtain the latest beam information in time and the quality of communication between network and UE could be deteriorated. In Rel-19 Multiple-Input Multiple-Output (MIMO) phase 5, UE initiated/event-driven beam management to reduce latency and/or overhead is discussed. The UE could initiate or trigger a beam report in response to some condition being met (e.g., quality of a current(ly) (activated) beam being lower than a threshold and/or quality of a new/candidate beam being higher than a threshold and/or quality of a new/candidate beam is a threshold value better than a current beam).

Regarding container carrying the UE-Initiated (UEI) report, basically Medium Access Control (MAC) Control Element (CE) or Uplink Control Information (UCI) could be considered. MAC CE may have latency due to the need of an Uplink (UL) grant for transmitting the MAC CE. On the other hands, UCI may require a network node to configure a plurality of periodic UL resource(s) for transmission, however, only part of them will be used by the UE for transmitting the UE-initiated report (i.e., when condition of an event is met). In order to solve this issue, PreNotification (PN) or an indication (before transmitting the UE-initiated report) could be used to indicate at least usage of future one or more periodic UL resources associated with the UE-initiated report. Depending on whether to transmit the UE-initiated report on a periodic UL resource or whether to trigger the UE-initiated report or whether there is a pending UE-initiated report or condition of an event being satisfied, the UE determines whether to transmit PN and/or sets of PNs to indicate usage of a periodic UL resource. In one example, when the UE-initiated report is not triggered or the UE will not transmit the UE-initiated report using a period UL resource or there is not a pending UE-initiated report or condition of an event being not satisfied, the UE could skip transmitting PN and/or the UE does not use the periodic UL resource. In other words, periodic UL resource is dedicated for UL transmission comprising at least the UEI report, and thus the associated PN for the corresponding UL resource is also subject to whether the UL transmission comprises at least the UEI report or not. Typically, one PN could be a sequence-based signal to indicate usage of a future one periodic UL resources (e.g., one-to-one mapping between the PN and UL resource). Alternatively in certain embodiments, one PN could be a sequence-based signal to indicate usage of a future one or more periodic UL resource. In one example the sequence-based signal could be a Sounding Reference Signal (SRS) or Scheduling Request (SR) or Physical Uplink Control Channel (PUCCH) format 0 with different cyclic shift mapping to "used" or "not used" in an example. If there is need to carry more information in addition to used/not used. PUCCH format 0 with more cyclic shift or other PUCCH format (e.g., PUCCH format 1, 2, 3, or 4) could be considered. Although PN could be transmitted along with a UL resource for the UE-initiated report similar to Configured Grant (CG)-UCI on Physical Uplink Shared Channel (PUSCH) which the CG-UCI indicates usage of future CG PUSCH resources, it may not be useful due to the triggering being more dynamic instead of in a periodic manner. PN could be considered to be transmitted along with same Transmission Time Interval (TTI) as a (corresponding periodic) UL resource. Alternatively in certain embodiments. PN could be transmitted in a different TTI than a (corresponding periodic) UL resource. PN could be transmitted in different Orthogonal Frequency Division Multiplexing (OFDM) symbols as a (corresponding periodic) UL resource. A set of contiguous OFDM symbols in a TTI could be used as a PN area for carrying PN (e.g., 1-st and/or 2-nd symbol in a TTI (e.g., symbol 0 and symbol 1 in a slot)). The PN area may be shared to a plurality of UEs. Alternatively in certain embodiments, the PN area could be dedicated to a UE. Alternatively in certain embodiments, one or more PNs are dedicated to the UE. Alternatively in certain embodiments, a second one or more PNs are common to the UE. Typically, in order to have better resource efficiency in the network node, a time gap or limitation between the PN and corresponding UL resource needs to be adopted. The time gap or limitation is used to guarantee the network node has enough time for switching and/or for other usage.

With introduction of the UEI report, there are two modes for resource allocation for the UEI report. Mode A (or mode-A) corresponds to dynamic scheduling while mode B (or mode-B) corresponds to a (pre-)configured resource for transmitting UEI report.

For mode A (or mode-A), the UE will transmit a request (which could be replaced by a specific signal or scheduling request (SR)) to the network node. After the transmission of the request, the UE monitors Downlink Control Information (DCI) with scheduling information (and/or with request for pending UEI report). Typically, DCI that the UE monitors or attempts for should comprise a CSI request field indicative of a code-point associated with the UEI report or associated with CSI-ReportConfig associated with the UEI report (or information of event). The UE transmits the UEI report on the resource scheduled by the DCI. In one example, in FIG. 5, t1 corresponds to a timing that the UE determines that condition of an event is satisfied or reached. t2 corresponds to a timing that the UE transmits a request to the network node for requesting a UL resource (for transmitting the UEI report). Typically, the UL channel for the request corresponds to or is PUCCH. Preferably in certain embodiments, the UL channel (in timing t2) may correspond to PUCCH format 0 or PUCCH format 1 or an SR. Before the UE receives the DCI (with CSI request field indicative of code-point associated with the UEI report), the UE could perform retransmission of step-1. Preferably in certain embodiments, a number of retransmission of step-1 or time interval that the UE could transmit step-1 may be subject to whether the UE receives the DCI or not. Preferably in certain embodiments, based on an earlier time between an ending time instance of a time interval and a time instance of receiving the DCI, the UE could determine whether to perform retransmission of step-1. t3 corresponds to a timing that the UE receives a DCI scheduling a UL resource (or a plurality of UL resources). The UL resource corresponds to at least timing t4. The UL resource could be PUSCH. The UEI report could be considered as UCI associated with a CSI report. Preferably in certain embodiments, the DCI received in t3 may request the UE to transmit one or a plurality of CSI reports to be transmitted in timing t4. Thus, the UEI report may have a UL resource and the UE could transmit the UEI report.

For mode B (or mode-B), one PN would be used to notify usage of a (pre-)configured resource which could enhance resource efficiency when deploying more (pre-)configured resources for latency reduction. Typically, the PN resource and (pre-)configured resource are configured in different instances/timings/TTIs. Alternatively in certain embodiments, the PN resource and (pre-)configured resource are configured in the same instance/timing/TTI. Once a condition of an event is fulfilled, the UE triggers the event and/or the UE triggers to transmit a UEI report. In one example, in FIG. 5, t1 corresponds to a timing that the UE determines that a condition of an event is satisfied or reached. t2 corresponds to a timing that the UE transmits a (Pre-) notification to the network node for notifying usage of the UL resource (i.e., UL resource in t3). The UL resource in timing t3 is (pre-)configured. The UL resource in timing t3 corresponds to Type-1 CG PUSCH. Preferably in certain embodiments, the UL resource in timing t3 corresponds to one PUSCH occasion according to one Type-1 CG PUSCH configuration (i.e., ConfiguredGrantConfig with one configuredGrantConfigIndex comprising rrc-ConfiguredUplinkGrant). The UE uses the UL resource if the UE has a pending UEI report or triggered (and not cancelled) event. Preferably in certain embodiments, payload size of the UL resource in timing t3 may correspond to a resource with a smaller payload size. Preferably in certain embodiments, the UL resource in timing t3 is not allowed to multiplex UL data (e.g., UL-SCH). Preferably in certain embodiments, in one example, one or two or four (or a fewer number of) Physical Resource Blocks (PRBs) are configured for the UL resource in timing t3. Preferably in certain embodiments, the UL resource in t3 could be used for transmitting UCI (in addition to the UEI report).

Preferably in certain embodiments, for mode-A and/or mode-B, the UEI report is carried via UCI and/or to is multiplexed and transmitted via PUSCH.

Before the UE transmits the UEI report, the (trigger of the) UEI report is pending. Before the UE cancels the triggering of the event, the UEI report is pending. Before the UE receives a response from the network node, the UEI report is pending. Before the end of a latency bound of the event, the (triggered) UEI report is pending. The trigger of the UEI report is considered to be pending before it is cancelled. The UE could cancel the trigger of the UEI report if or when the UE transmits the UEI report and/or a UL resource could accommodate the UEI report.

For a pending UEI report, for mode A, the UE will determine or select a valid resource. The UE will transmit request (a specific request or a scheduling request) on the determined/selected resource. The UE will monitor DCI with scheduling information (and/or with request for the pending UEI report). The DCI could indicate the request is used for requesting the UEI report or network node triggered report. One code-point in a bit field could be used to indicate (at least information of) whether the request is used for requesting the UEI report or network node triggered report. The bit field could be a CSI request. Based on the code-point of the bit field, the UE could determine whether the DCI requests for the network node triggered report (associated with CSI-ReportConfig without event information or condition) or the UEI report (associated with CSI-ReportConfig with event information or condition). If the UE has pending more than one UEI reports, once the UE receives the DCI, the UE determines one UEI report among the more than one UEI report. Alternatively in certain embodiments, the UE could multiplex the more than one UEI report (if a resource scheduled by the DCI with accommodate code rate could accommodate the more than one UEI report).

For a pending UEI report, for mode B, the UE will determine or select a valid PN resource and/or valid (pre-) configured resource for transmitting the UEI report. The UE will transmit the PN on the determined/selected PN resource and transmit the pending UEI report on the determined/ selected (pre-)configured resource.

For mode B, a UE could be configured with one or more (pre-)configured resources (e.g., Type 1 CG) for transmitting UEI report and one or more PN resource for indicating the usage of the (pre-)configured resources. The resources could be configured or indicated in a CSI reporting configuration (e.g., CSI-ReportConfig or report configuration for UEI report). For example, the PN resource(s) could be associated with PUCCH resources (e.g., scheduling request resources and/or the (pre-)configured resource(s) could be associated with a configured uplink grant configuration (e.g., a Type 1 or Type 2 configured uplink grant associated with a ConfiguredGrantConfigIndex). The PN resource(s) and the (pre-)configured resource(s) could be located on different frequencies (e.g., configured on different Bandwidth Parts (BWPs) or on different Cells). The different frequencies could be associated with different Cells. Each of the different Cells could be associated with or could be in different Timing Advance Groups (TAGs) (and could be associated with different Timing Advances (TAs)). For example, PN resource(s) associated with a UEI report configuration (e.g., indicated in a CSI-ReportConfig) could be a PUCCH resource(s) on a Primary Cell of the UE, and (pre-)configured resource(s) could be configured on a (UL BWP of a) Secondary Cell.

In the current specification, the UE maintains a TA timer (TimeAlignmentTimer) for each TAG to control uplink time alignment of Serving Cells associated with the TAG. In response to expiry/expiration of the TA timer of the TAG, the UE could perform one or more actions for Serving Cell(s) associated with the TAG and/or other Serving Cell(s) associated with other TAGs (e.g., based on the type of the TA-expired TAG). For example, in response to a TA timer expiry associated with Primary Timing Advance Group (PTAG), the UE could notify Radio Resource Control (RRC) to clear any PUSCH resource associated with configured uplink grant(s), clear any PUSCH resource for semi-persistent CSI reporting and notify RRC to release PUCCH for all Serving Cells, if configured. For another example, in response to a TA timer expiry associated with a TAG (e.g., Secondary Timing Advance Group (STAG)), the UE could notify RRC to release PUCCH, if configured and/or clear configured uplink grants for all SCells configured with (only) this TAG (and not other Cells configured with other TAGs). One issue could occur when a first TA timer associated with a first TAG expires while a second TA timer associated with a second TAG is running. For example, the first TAG is associated with a first Serving Cell associated with (pre-)configured resource(s) of a triggered UEI report (or associated with (pre-)configured resource(s) for transmitting the triggered UEI report). The second TAG is associated with a second Serving Cell associated with PN resource(s) of the triggered UEI report. Typically, for a PUCCH group (configured to a UE) comprising both the first Serving Cell and the second Serving Cell, only one cell in the PUCCH group is configured with a PUCCH resource. In this case, the one cell is the second Serving Cell. Besides, the second Serving Cell could be a Primary Cell (PCell) or Secondary Cell (SCell) configured with a PUCCH resource (in view of the UE). With expiry of the first TA timer, the UE could clear configured downlink assignments and configured uplink grants and clear PUSCH resources for semi-persistent CSI reporting for the first Serving Cell. However, since the PUCCH resource on the second Serving Cell is not released in response to expiry of the first TA timer, the PN resource(s) of the triggered UEI report will still be valid and the UE will perform transmission of the PN on the first Serving Cell. The network will receive the PN but the corresponding UEI report transmission will not be received by the network as the (pre-configured) resources (e.g., the configured uplink grants) are cleared by the UE. This will cause unnecessary PUCCH transmission on the first serving Cell and possibly waste of PUSCH resources (e.g., retransmission resources scheduled by the network).

With the present invention, methods are discussed for handling UEI report triggering and resources across multiple TAGs in response to TA expiry.

- In mode B UEI report, measured Cell, PUSCH configured grant, and Notification UCI may be (all) on different BWPs of different Serving Cells associated with different TAGs.
- How to deal with triggering of UEI in response to TA expiry.
- STAG expiry of PUSCH configured grant.
- PTAG expiry.
- Measured Cell TAG expiry.
- MAC reset.
- Cell deactivation.
  - Cancel trigger of UEI report.
  - release CSI reporting.
  - Release/stop transmission of/cancel PN (PUCCH resource even if the pTAG TA is still valid).
  - Consider both PN and CG's TA to be invalid.
  - (Change to mode-A or exceptional resource for TA expiry case).

A PN Cell and CG Cell should be configured in a same TAG (assumption: the PN can be transmitted on STAG).

The UE could have a first Serving Cell. Additionally, the UE could have a second Serving Cell. The first Serving Cell could be associated with (or belong to) a first TAG. The second Serving Cell could be associated with (or belong to) the first TAG. Alternatively in certain embodiments, the second Serving Cell could be associated with (or belong to) a second TAG.

The first TAG could be a PTAG. Alternatively in certain embodiments, the first TAG could be a first STAG. The second TAG could be the PTAG. Alternatively in certain embodiments, the second TAG could be a second STAG.

Resource for transmitting a UEI report for the first Serving cell (e.g., PUSCH resource) could be configured on the first Serving Cell (e.g., the UEI report is to be transmitted on the first Serving Cell). Alternatively in certain embodiments, the resource for transmitting a UEI report for the first Serving cell (e.g., PUSCH resource) could be configured on the second Serving Cell (e.g., the UEI report is to be transmitted on the second Serving Cell). The resource of the PN for the UEI report for the first Serving cell (e.g., PUCCH resource) could be configured on the first Serving Cell (e.g., the PN is to be transmitted on the first Serving Cell). Alternatively in certain embodiments, the resource of the PN for the UEI report for the first Serving cell (e.g., PUCCH resource) could be configured on the second Serving Cell (e.g., the PN is to be transmitted on the second Serving Cell).

Clear Mode B Resources in Response to TA Expiry of (Any) One Associated TAG

One concept of the present invention is that a UE could release or clear (at least) one or more resources on a first Serving Cell associated with a first TAG in response to (UL) TA misalignment of a second TAG. The second TAG could be associated with a second Serving Cell. The second Serving Cell could be associated with a UE-initiated beam reporting configuration containing the one or more resources on the first Serving Cell (and second one or more resources on the second Serving Cell).

The (at least) one or more resources could be associated with or configured in a UE-initiated (UEI) beam reporting configuration for a (BWP of a) Cell. The Cell could be a Serving Cell (e.g., the first Serving Cell or the second Serving Cell). The Cell could be a Candidate Cell for a L1/L2-triggered mobility (LTM) Cell Switch. The UEI beam reporting configuration could be a CSI-ReportConfig or CSI report configuration for UEI reporting. The UE-initiated beam reporting configuration could be a mode B UEI beam reporting configuration. Additionally and/or alternatively in certain embodiments, the UE could be configured with mode B UEI beam reporting.

The at least one or more resources could include PUCCH resource(s) for transmitting the PN or report notification associated with a (triggered) UEI beam reporting.

Additionally and/or alternatively in certain embodiments, the at least one or more resources could include PUSCH resources (only) for transmitting the UEI report associated with a triggered UEI beam reporting.

For example, the first Serving Cell could contain PUCCH resource(s) (for transmitting report notification or PN) associated with the UEI beam reporting configuration for the second Serving Cell. The second Serving Cell could contain PUSCH resources for transmitting the UEI beam report associated with the UEI beam reporting configuration. In response to expiry of timeAlignmentTimer of TAG associated with the second Serving Cell (and not associated with the first Serving Cell), the UE releases and/or clears the PUCCH resources(s) (associated with the UEI beam reporting configuration for the second Serving Cell) in the first Serving Cell (and also clears or releases the PUSCH resources in the Second Serving Cell). Additionally and/or alternatively in certain embodiments, in response to expiry of timeAlignmentTimer of TAG associated with the first Serving Cell (and not associated with the second Serving Cell), the UE releases and/or clears the PUSCH resources(s) (associated with the UEI beam reporting configuration for the second Serving Cell) in the second Serving Cell (and also clears or releases the PUCCH resources in the first Serving Cell).

Additionally and/or alternatively in certain embodiments, the UE could clear (all) resources configured in a UEI beam reporting configuration in response to (UL) TA misalignment of a TAG associated with a (or any) Serving Cell configured with resource associated with the UEI beam reporting configuration.

The (UL) TA misalignment could be associated with expiry of a timer. For example, the (UL) TA misalignment of the second TAG could be associated with expiry of a second TA timer (timeAlignmentTimer) of the second TAG.

The (UL) TA misalignment associated with the second TAG is not associated with the first TAG. The UE could release or clear the one or more resources on the first Serving Cell associated with the first TAG in response to (UL) TA misalignment of the second TAG regardless of TA alignment of the first TAG (or release or clear the one or more resources even when the first TAG is uplink time aligned).

Additionally and/or alternatively in certain embodiments, the (UL) TA misalignment could be associated with reset of a MAC entity.

Additionally and/or alternatively in certain embodiments, the (UL) TA misalignment could be associated with radio link failure.

The second TAG could be a secondary TAG. Alternatively in certain embodiments, the second TAG could be a primary TAG. The second TAG could be associated with Serving Cell measured by the UE based on the UEI beam reporting configuration.

The first TAG could be a secondary TAG (STAG). Alternatively in certain embodiments, the first TAG could be a primary TAG (PTAG).

The first Serving Cell could be a Primary Cell. The first Serving Cell could be a Secondary Cell.

The second Serving Cell could be a Primary Cell. The second Serving Cell could be a Secondary Cell.

The first Serving Cell and the second Serving cell are configured in one cell group.

The first Serving Cell and the second Serving cell are configured in one PUCCH group.

The first and/or the second Serving Cell could be associated with beam measurement or CSI measurement associated with the UEI beam reporting configuration. The UE could monitor and/or perform measurements on the first and/or the second Serving Cell in response to the UEI beam reporting configuration.

Additionally and/or alternatively in certain embodiments, the UE could perform (a part of) at least one action in response to (UL) TA misalignment of the second TAG. The second TAG could be associated with a Cell with a triggered UEI beam reporting.

The at least one action could include cancelling a (or all) triggered (and/or pending) UEI beam reporting associated with UEI beam reporting configuration containing resources associated with the second TAG. For example, the UE could cancel a triggered UEI beam reporting of a first Serving Cell in response to TA misalignment of a second TAG if or when the triggered UEI beam reporting is associated with (UEI beam reporting configuration containing) PN resources or PUSCH resources on a second Serving Cell that is associated with or is in the second TAG.

Additionally and/or alternatively in certain embodiments, the at least one action could include clearing (any) PUSCH resource and/or PUSCH resource for UEI beam reporting associated with Serving Cells associated with the second TAG. The PUCCH resource and/or PUSCH resource could be configured on Serving Cells associated with the second TAG or on Serving Cells associated with other TAGs.

Additionally and/or alternatively in certain embodiments, the at least one action could include stopping transmission of the PN and/or PUCCH resources on a first Serving Cell associated with a first TAG. The PN and/or PUCCH resources could be associated with (periodic UL resource for transmitting) a triggered UEI beam reporting. The triggered UEI beam reporting could be associated with a UEI beam reporting configuration associated with a second Serving Cell. The second Serving Cell could be associated with the second TAG. The first Serving Cell may not be associated with the second TAG (but the UE stops the transmission on the first Serving Cell regardless (UL) TA misalignment of the first TAG). The first TAG could be uplink time-aligned. The UE could be configured with association of a PUCCH resource and PUSCH resource (for UEI beam reporting) to be on a same or different Serving Cell. The UE could be configured Mode-B for transmitting the UEI report. Based on UEI beam reporting configuration on the second Serving cell (e.g., CSI-ReportConfig with event related information), the UE could determine association between a PUCCH resource (on the first Serving Cell) and PUSCH resource (on the second Serving Cell).

Additionally and/or alternatively in certain embodiments, the at least one action could include stopping transmission of PUSCH resources (for UEI beam report) on a first Serving Cell associated with a first TAG. The PUSCH resources could be associated with a triggered UEI beam reporting. The PUSCH resources are configured via Type-1 UL CG PUSCH. The triggered UEI beam reporting could be associated with a UEI beam reporting configuration associated with a second Serving Cell. The second Serving Cell could be associated with the second TAG. The first Serving Cell may not be associated with the second TAG (but the UE stops the transmission on the first Serving Cell regardless (UL) TA misalignment of the first TAG). The first TAG could be uplink time-aligned. The UE could be configured with association of a PUCCH resource and PUSCH resource (for UEI beam reporting) to be on a same or different Serving Cell. The UE could be configured Mode-B for transmitting the UEI report. Based on UEI beam reporting configuration on the second Serving cell (e.g., CSI-Report-Config with event related information), the UE could determine association between a PUCCH resource (on the first Serving Cell) and PUSCH resource (on the second Serving Cell).

Additionally and/or alternatively in certain embodiments, the at least one action could include the UE considering a first TAG to be uplink TA misaligned. The first TAG could be associated with a UL resource (PN and/or PUCCH and/or PUSCH) associated with a triggered UEI beam report associated with a Cell associated with the second TAG.

Alternatively in certain embodiments, the UE may not consider the first TAG to be uplink TA misaligned in response to TA misalignment of the second TAG.

Additionally and/or alternatively in certain embodiments, the at least one action could include the UE considering one or more UL transmissions associated with a first TAG to be uplink TA misaligned. The one or more UL transmissions correspond to the PN and/or PUCCH and/or PUSCH. Based on a UEI beam reporting configuration, the one or more UL transmissions on the first Serving Cell (associated with the first TAG) are to associate with one or more type-1 UL CG PUSCH resources on a second Serving Cell (associated with a second TAG). The first TAG could be associated with a UL resource (PN and/or PUCCH and/or PUSCH) associated with a triggered UEI beam report associated with a Cell associated with the second TAG. For a third UL transmission associated with the first TAG ((UL) aligned one), which is associated with a second UL transmission associated with the second TAG ((UL) misaligned one), the at least one action could include the UE considering the third UL transmission associated with the first TAG to be uplink TA misaligned. For a first UL transmission associated with the first TAG ((UL) aligned one), which is NOT associated with a second UL transmission associated with the second TAG ((UL) misaligned one), the at least one action could include the UE considering the first UL transmission associated with the first TAG to be uplink TA aligned.

Additionally and/or alternatively in certain embodiments, the UE could transmit the UEI report on an exceptional resource on a Cell when or if a TAG of Serving Cell(s) associated with the (original) one or more resources for the UEI report and/or for the PN is UL TA misaligned. The exceptional resource could be on a PCell. The exceptional resource could be a Physical Random Access Channel (PRACH) resource. The exceptional resource could be received via a random access procedure. Additionally and/or alternatively in certain embodiments, the exceptional resource could be obtained via a mode A UEI beam reporting configuration.

Additionally and/or alternatively in certain embodiments, the UE could transmit the UEI report on a UL resource scheduled by an L1 or L2 signal. The L1 or L2 signal corresponds to DCI or MAC CE (e.g., Random Access Response (RAR) UL grant). Preferably in certain embodiments, the UE could perform transmission on a step-1 resource. Preferably in certain embodiments, the UE is not allowed to (or does not) perform transmission on a corresponding step-2 resource. Preferably in certain embodiments, the UE does not clear or release a PUCCH resource which is determined as (UL aligned) in response to associated type-1 UL CG PUSCH which is determined as (UL misaligned). Preferably in certain embodiments, after timing of a type-1 UL CG PUSCH, the UE could attempt to monitor an L1 or L2 signal. Preferably in certain embodiments, after timing of type-1 UL CG PUSCH, the UE receives the L1 or L2 signal. Preferably in certain embodiments, the L1 or L2 signal could provide indication for UEI beam reporting retransmission. Preferably in certain embodiments, the indication may indicate time information of which type-1 UL CG PUSCH is triggered for (re)transmission. Preferably in certain embodiments, the indication may indicate type-1 UL CG PUSCH Identity/Identification (ID) (associated with UEI beam report). Preferably in certain embodiments, based on the indication, the UE could determine the L1 or L2 signal indicates for which type-1 UL CG PUSCH's UEI beam report (retransmission). Preferably in certain embodiments, the indication could be an indicated by one field in addition to a CSI request field. Preferably in certain embodiments, the indication could correspond to a specific code-point of a CSI request field associated with the UEI beam report (in mode-B). Alternatively in certain embodiments, the L1 or L2 signal provides trigger/request of a UEI beam reporting (retransmission). Based on the latest timing of type-1 UL CG PUSCH before receiving the L1 or L2 signal, the UE could determine which UEI beam reporting is triggered/requested. Based on latest timing of a type-1 UL CG PUSCH indicated via type-1 UL CG PUSCH ID before receiving the L1 or L2 signal, the UE could determine which UEI beam reporting is triggered/requested.

When a timeAlignmentTimer associated with the first TAG expires, the UE could perform one or multiple actions of the first actions. The UE may not perform one or multiple actions of the second actions (when a timeAlignmentTimer associated with the first TAG expires). A timeAlignmentTimer associated with the second TAG could be running. Alternatively in certain embodiments, the timeAlignmentTimer associated with the second TAG may not be running.

When a timeAlignmentTimer associated with the second TAG expires, the UE could perform one or multiple actions of the first actions. The UE may not perform one or multiple actions of the second actions (when a timeAlignmentTimer associated with the second TAG expires). A timeAlignmentTimer associated with the first TAG could be running. Alternatively in certain embodiments, the timeAlignmentTimer associated with the first TAG may not be running.

The first actions could include:

Release or clear the resource for transmitting the UEI report for the first Serving cell, Keep the resource for transmitting the UEI report for the first Serving cell, Stop using or suspend the resource for transmitting the UEI report for the first Serving cell, Do not transmit the UEI report for the first Serving cell, Release or clear the resource of the PN for the UEI report for the first Serving cell, Keep the resource of the PN for the UEI report for the first Serving cell, Stop using the resource of the PN for the UEI report for the first Serving cell, Do not transmit the PN for the UEI report for the first Serving cell, Allow to transmit the PN for the UEI report for the first Serving cell, Cancel the UEI report for the first Serving cell which has been triggered, Keep the UEI report for the first Serving cell which has been triggered, Release or clear configuration for the UEI report for the first Serving cell,
Keep configuration for the UEI report for the first Serving cell,
Stop or suspend evaluation for whether to trigger the UEI report for the first Serving cell, and/or
Keep evaluation for whether to trigger the UEI report for the first Serving cell.

The second actions could include:
Release or clear the resource for transmitting the UEI report for the first Serving cell,
Keep the resource for transmitting the UEI report for the first Serving cell,
Stop using or suspend the resource for transmitting the UEI report for the first Serving cell,
Do not transmit the UEI report for the first Serving cell,
Release or clear the resource of the PN for the UEI report for the first Serving cell,
Keep the resource of the PN for the UEI report for the first Serving cell,
Stop using the resource of the PN for the UEI report for the first Serving cell,
Do not transmit the PN for the UEI report for the first Serving cell,
Allow to transmit the PN for the UEI report for the first Serving cell,
Cancel the UEI report for the first Serving cell which has been triggered,
Keep the UEI report for the first Serving cell which has been triggered,
Release or clear configuration for the UEI report for the first Serving cell,
Keep configuration for the UEI report for the first Serving cell,
Stop or suspend evaluation for whether to trigger the UEI report for the first Serving cell, and/or
Keep evaluation for whether to trigger the UEI report for the first Serving cell.

For example, when the timeAlignmentTimer associated with the first TAG expires (and the timeAlignmentTimer associated with the second TAG is running), the UE could:
Release or clear the resource for transmitting the UEI report for the first Serving cell,
Release or clear the resource of the PN for the UEI report for the first Serving cell,
Cancel the UEI report for the first Serving cell which has been triggered,
Release or clear configuration for the UEI report for the first Serving cell, and/or
Stop or suspend evaluation for whether to trigger the UEI report for the first Serving cell.

For example, when the timeAlignmentTimer associated with the first TAG expires and the timeAlignmentTimer associated with the second TAG is running, the UE could:
Release or clear the resource for transmitting the UEI report for the first Serving cell,
Stop using or suspend the resource for transmitting the UEI report for the first Serving cell,
Do not transmit the UEI report for the first Serving cell,
Keep the resource of the PN for the UEI report for the first Serving cell,
Allow to transmit the PN for the UEI report for the first Serving cell,
Keep the UEI report for the first Serving cell which has been triggered,
Keep configuration for the UEI report for the first Serving cell, and/or
Keep evaluation for whether to trigger the UEI report for the first Serving cell.

For example, when the timeAlignmentTimer associated with the second TAG expires and the timeAlignmentTimer associated with the first TAG is running, the UE could:
Release or clear the resource for transmitting the UEI report for the first Serving cell,
Release or clear the resource of the PN for the UEI report for the first Serving cell,
Cancel the UEI report for the first Serving cell which has been triggered,
Release or clear configuration for the UEI report for the first Serving cell, and/or
Stop or suspend evaluation for whether to trigger the UEI report for the first Serving cell.

For example, when the timeAlignmentTimer associated with the second TAG expires and the timeAlignmentTimer associated with the first TAG is running, the UE could:
Keep the resource for transmitting the UEI report for the first Serving cell,
Stop using or suspend the resource for transmitting the UEI report for the first Serving cell,
Do not transmit the UEI report for the first Serving cell,
Release or clear the resource of the PN for the UEI report for the first Serving cell,
Keep the UEI report for the first Serving cell which has been triggered,
Keep configuration for the UEI report for the first Serving cell, and/or
Keep evaluation for whether to trigger the UEI report for the first Serving cell.

For the above examples, the first Serving Cell could be associated with the first TAG and not associated with the second TAG. Alternatively in certain embodiments, the first Serving Cell could be associated with the second TAG and not associated with the first TAG.

For example, a UE could be configured with a first Serving Cell configured with a UEI beam reporting configuration, and the UEI beam reporting configuration could contain PUCCH resource(s) for transmitting a PN on a second Serving Cell and contain PUSCH resources for transmitting the UEI report on the first Serving Cell. The first Serving Cell could be associated with a first TAG and the second Serving Cell could be associated with a second TAG. In response to time AlignmentTimer expiry of the first TAG, the UE could:

1) Release/clear the PUSCH resource(s) on the first Serving Cell and release/clear the PUCCH resource(s) on the second Serving Cell,
2) Release/clear the PUSCH resource(s) on the first Serving Cell and keep (not release) the PUCCH resource(s) on the second Serving Cell, and the UE stop using the PUCCH resource(s) of the PN or does not transmit PN for the UEI report for the first Serving Cell, or
3) Release/clear the PUSCH resource(s) on the first Serving Cell and keep (not release) the PUCCH resource(s) on the second Serving Cell, and the UE continues to or is allowed to transmit the PN for the UEI report for the first Serving Cell.

Clear Mode B Resources in Response to Deactivation of any of Associated Cell

Additionally and/or alternatively in certain embodiments, the UE could release or clear (at least) one or more resources on a first Serving Cell in response to deactivation of a second Serving Cell. The one or more resources could be associated with UEI beam reporting associated with the second Serving Cell (or the first Serving Cell). The one or more resources could be PUCCH resources (for PN or for report notification) and/or PUSCH resources (for UEI beam report transmission).

Additionally and/or alternatively in certain embodiments, the UE could cancel a (or all) triggered (and/or pending) UEI beam reporting associated with a UEI beam reporting configuration containing resources associated with the deactivated Serving Cell. For example, the UE could cancel a triggered UEI beam reporting of a first Serving Cell in response to deactivation of a second Serving Cell if or when the triggered UEI beam reporting is associated with (UEI beam reporting configuration containing) PN resources or PUSCH resources on the second Serving Cell.

Additionally and/or alternatively in certain embodiments, the UE could clear (any) PUSCH resource and/or PUSCH resource for UEI beam reporting associated with deactivated Serving Cell(s). The PUCCH resource and/or PUSCH resource could be configured on the deactivated Serving Cell(s) or on activated (and not-deactivated) Serving Cell(s).

Additionally and/or alternatively in certain embodiments, the UE could stop transmission of PN and/or PUCCH resources on a first Serving Cell in response to deactivation of a second Serving Cell. The PN and/or PUCCH resources could be associated with a triggered UEI beam reporting (of the second Serving Cell). The triggered UEI beam reporting could be associated with a UEI beam reporting configuration associated with a second Serving Cell.

Additionally and/or alternatively in certain embodiments, the UE could stop transmission of PUSCH resources (for UEI beam report) on a first Serving Cell in response to deactivation of a second Serving Cell. The PUSCH resources could be associated with a triggered UEI beam reporting (of the second Serving Cell). The triggered UEI beam reporting could be associated with a UEI beam reporting configuration associated with a second Serving Cell.

NW Restriction: Same TAG for PN and PUSCH Resource for UEI Report

Additionally and/or alternatively in certain embodiments, a Network (NW) may not (be allowed to) configure (all) one or more resources for a UEI beam reporting configuration on Serving Cells with different TAGs (or different PUCCH groups). The NW could be (only) allowed to configure (all) one or more resources for a UEI beam reporting configuration on Serving Cells with a same TAG (or a same PUCCH group). For example, for a UEI beam reporting configuration (for a first or Second Serving Cell), the NW could configure a PN or report notification resource on a first Serving Cell with a first TAG and configure a PUSCH resource (Type 1 configured uplink grant) on a second Serving Cell with the first TAG.

When a resource for transmitting a UEI report for the first Serving cell (e.g., PUSCH resource) is configured on the first Serving Cell (e.g., the UEI report is to be transmitted on the first Serving Cell) and a resource of a PN for the UEI report for the first Serving cell (e.g., PUCCH resource) is configured on the second Serving Cell (e.g., the PN is to be transmitted on the second Serving Cell), a NW may not (be allowed to) configure the first Serving Cell and the second Serving Cell belonging to different TAGs. The NW could be (only) allowed to configure the resource for transmitting the UEI report for the first Serving cell and the resource of the PN for the UEI report for the first Serving cell on the same Serving Cell (e.g., the first Serving Cell) or on Serving Cells (e.g., the first Serving Cell and the second Serving Cell) belonging to the same TAG.

When a resource for transmitting a UEI report for the first Serving cell (e.g., PUSCH resource) is configured on the first Serving Cell (e.g., the UEI report is to be transmitted on the first Serving Cell) and a resource of a PN for the UEI report for the first Serving cell (e.g., PUCCH resource) is configured on the second Serving Cell (e.g., the PN is to be transmitted on the second Serving Cell), a NW may not (be allowed to) configure the first Serving Cell and the second Serving Cell belonging to different PUCCH groups. The NW could be (only) allowed to configure the resource for transmitting the UEI report for the first Serving cell and the resource of the PN for the UEI report for the first Serving cell on the same Serving Cell (e.g., the first Serving Cell) or on Serving Cells (e.g., the first Serving Cell and the second Serving Cell) belonging to the same PUCCH group.

For the methods, alternatives, concepts, examples, and embodiments detailed above and herein, the following aspects and embodiments are possible.

A UE-initiated beam reporting could be a CSI reporting. A UE-initiated beam reporting could be an event-driven beam reporting.

UEI beam reporting, UEI reporting, a UEI beam report, a UEI report could be exchangeable or interchangeable.

The UEI beam reporting configuration, the UEI report configuration, and the UEI beam report configuration could be interchangeable.

A UE-initiated beam reporting (procedure) of a Cell could contain measuring (Reference Signal (RS) on) the Cell. The UE-initiated beam reporting (procedure) of the Cell could contain determining a beam quality of the Cell fulfilled one or more events associated with (measurement objects of) the Cell (for a period of time). The UE-initiated beam reporting could contain triggering a UE-initiated beam reporting when one or more events have been fulfilled for a period of time (alternatively in certain embodiments, the UE could trigger a UE-initiated beam reporting (at once) when (condition of) one or more events have been fulfilled).

A measurement object associated with a UE-initiated beam reporting could be associated with a Cell and/or a Transmission Configuration Indicator (TCI) state or beam associated with the Cell. The measurement object could be configured with or be associated with an event.

The UE-initiated beam reporting could be triggered or initiated in response to one or more condition(s) being met.

The one or more condition(s) could contain condition(s) associated with beam quality. For example, a condition could be quality of a (currently) activated beam being lower than or equal to a threshold. Additionally and/or alternatively in certain embodiments, a condition could be quality of a candidate beam being higher than or equal to a threshold. The one or more conditions could be associated with or based on measurement report triggering event.

Additionally and/or alternatively in certain embodiments, the condition could contain a candidate beam quality being higher than or equal to a (currently) activated beam quality (for a period of time, e.g., timeToTrigger).

The UE-initiated beam reporting could contain determining whether to trigger the reporting based on at least measured beam quality.

The condition could be associated with a (configured) event.

An event could be quality of a new (measured) beam of a Cell is a threshold value better than a current beam.

An event could be quality of a current beam is lower than a threshold.

An event could be quality of a new (measured) beam of a Cell is better than a threshold (+an offset).

An event could be associated with an eventId in EventTriggerConfig.

Preferably in certain embodiments, current beam corresponds to RS in an indicated TCI state which corresponds to Quasi-Colocation (QCL) type-D.

Preferably in certain embodiments, a current beam corresponds to an RS in an indicated TCI state which is configured with repetition. Preferably in certain embodiments, a current beam corresponds to a Synchronization Signal Block (SSB) associated with RS in an indicated TCI state which corresponds to QCL type-D.

Preferably in certain embodiments, a current beam corresponds to an RS in an activated TCI state which corresponds to QCL type-D (with worst beam quality or best beam quality among more than one activated TCI state).

Preferably in certain embodiments, the more than one activated TCI state is activated by a TCI state (de)activation MAC CE.

Preferably in certain embodiments, an indicated TCI state or activated TCI corresponds to Downlink (DL) or joint TCI state. The beam quality could include (L1 or L3) Reference Signal Received Power (RSRP), Reference Signal Received Quality (RSRQ), Received Signal Strength Indicator (RSSI), and/or Signal-to-Interference Plus Noise Ratio (SINR) associated with a beam.

A UE-initiated beam reporting could contain a trigger (of the reporting).

The UE-initiated beam reporting could contain triggering and/or transmitting a request (e.g., SR, or a specific request in addition to SR).

The UE-initiated beam reporting could contain initiating a random access procedure.

UE-initiated beam reporting could contain assembling a beam report (e.g., the beam report could be MAC CE and/or RRC message and/or PUCCH signal).

The UE-initiated beam reporting could contain transmitting a beam report to a network.

The UE-initiated beam reporting could be initiated and/or configured for a Serving Cell. Additionally and/or alternatively in certain embodiments, the UE-initiated beam reporting could be initiated and/or configured for a candidate cell or a non-Serving Cell.

The UE-initiated beam reporting could be an event-triggered L1 measurement reporting associated with LTM.

The UE-initiated beam reporting could contain cancelling a trigger of the beam reporting.

The UE-initiated beam reporting of a Cell could contain performing measurements for (BWP of) the Cell. The UE-initiated beam reporting could contain a trigger of the UE-initiated beam reporting. The UE-initiated beam reporting could contain generating and/or transmitting a UE-initiated beam report (associated with at least the Cell).

The UE could cancel the UE-initiated beam reporting in response to an initiation of the one or more procedures.

The UE could cancel the UE-initiated beam reporting in response to an acknowledgement of the beam report from the network. The acknowledgement could be a UL grant for new transmission associated with a Hybrid Automatic Repeat Request (HARQ) process used to transmit the beam report. The acknowledgement could be a beam activation/deactivation MAC CE. Additionally and/or alternatively in certain embodiments, the UE could cancel the UE-initiated beam reporting (associated with a Cell) in response to transmitting the corresponding UE-initiated beam report (reporting information associated with the Cell).

When cancelling or stopping a UE-initiated beam reporting, the UE could stop corresponding procedure(s) contained in the UE-initiated beam reporting (mentioned above).

When cancelling or stopping a UE-initiated beam reporting, the UE could stop or restart a timer for calculating or determining whether to trigger a UE-initiated beam reporting (e.g., a timeToTrigger—like timer).

The cancellation or stopping of the UE-initiated beam reporting could contain stopping the random access procedure. Additionally and/or alternatively in certain embodiments, the cancellation or stopping of the UE-initiated beam reporting could contain stopping one or more timers associated with the UE-initiated beam reporting (e.g., timetotrigger for the beam reporting or timers associated with the random access procedures and/or associated with SR).

The cancellation or stopping of the UE-initiated beam reporting of a Cell could contain not including or reporting (beam) information associated with the Cell in a UE-initiated beam report.

The cancellation or stopping of the UE-initiated beam reporting of a Cell could contain (re)starting or resetting or stopping a timer or a counter associated with UE-initiated beam reporting of the Cell.

The timer or the counter could be used or configured to trigger or prohibit the UE-initiated beam reporting of the Cell.

The UE could be configured with measurement object(s) associated with the UE-initiated beam reporting.

A measurement object could contain a Serving Cell and/or a non-serving cell.

A measurement object could be associated with SSB and/or Channel State Information Reference Signal (CSI-RS) associated with the Serving Cell and/or the non-Serving Cell.

To prioritize a UE-initiated beam reporting over one or more procedures, the UE stops the procedure and continues the reporting.

To prioritize a first one or more procedures over a UE-initiated beam reporting, the UE stops/cancels the reporting and continues the one or more procedures.

The reporting and the first one or more procedures could be overlapped in time domain.

The reporting and the procedure could be associated with a same serving cell and/or a same MAC entity and/or a same Cell group (e.g., Master Cell Group (MCG) or Secondary Cell Group (SCG)).

The beams could be replaced by or referred to as SSB, CSI-RS, and/or (DL or UL) TCI states.

The Cell could be a Serving Cell, candidate cell, and/or a neighboring cell.

A candidate cell could be an LTM candidate Cell. A neighboring cell could be a cell associated with a measurement object. The candidate cell and the neighboring cell are not Serving Cells.

A UE-initiated beam report (generated in response to a UE-initiated beam reporting) could be a PUCCH signaling and/or a MAC CE and/or UCI on PUSCH. The UE-initiated beam report could indicate at least one of a measurement object associated with the UE-initiated beam reporting or the associated Cell.

For a prioritized transmission, the UE could perform the prioritized transmission via a valid resource. The valid resource could be a PUCCH resource or a PUSCH resource. The valid resource could be for UE-initiated beam reporting (for candidate cell and/or for Serving Cell).

The beam report transmission could be a UL transmission including transmission of the beam report. The beam report could be a report generated in response to a triggered beam reporting.

The first beam report could be associated with a first candidate cell or a first Serving Cell.

The second beam report could be associated with a second candidate cell or a second Serving Cell.

A beam report associated with a candidate cell could be associated with an MCG (e.g., associated with (quality of) a Serving Cell in MCG) or a SCG (e.g., associated with (quality of) a Serving Cell in SCG).

The first beam report could be associated with a first measurement object and/or a first triggering event associated with the first candidate cell or the first Serving Cell.

The second beam report could be associated with a second measurement object and/or a second triggering event associated with the second candidate cell or the second Serving Cell.

A beam could be associated with a CSI-RS resource and/or an SSB.

The beam quality could be RSRP, RSRQ, or RSSI.

Beam reporting/beam report for a candidate cell could be for a (fast) LTM and/or for a Cell switch.

The PUSCH resources could be a configured uplink grant Type 1.

The PUCCH resources could be Scheduling Request resources.

The UL TA misalignment TAG could be a PTAG or a TAG with a first Serving Cell with a PUCCH resource.

The UL TA misalignment TAG could be a STAG or a TAG with a second Serving Cell with a PUSCH resource.

The UL TA misalignment TAG could be associated with a Serving Cell associated with the UEI beam reporting configuration.

Preferably in certain embodiments, a PN or a resource of a PN could be configured via a scheduling request related configuration.

Preferably in certain embodiments, a PN or a resource of a PN could be configured via a configuration in addition to a scheduling request configuration (schedulingRequest-Config).

Preferably in certain embodiments, a UEI report for one Serving cell corresponds to a UEI report according to CSI-ReportConfig configured on the one Serving cell.

Preferably in certain embodiments, a UEI report for one Serving cell corresponds to a UEI report to be transmitted on a step-2 resource which is on the one Serving cell (e.g., container interpretation for the UEI report for one Serving cell).

Preferably in certain embodiments, a UEI report for one Serving cell corresponds to a UEI report with (one or more candidate beams or) one or more candidate reference signals configured on the one Serving cell. (e.g., content interpretation for the UEI report for one Serving cell).

Preferably in certain embodiments, a UEI report for one Serving cell corresponds to a UEI report with a (current beam or) reference signal, associated with an indicated TCI state, configured on the one Serving cell (e.g., content interpretation for UEI report for one Serving cell). All concepts, example, aspects, and embodiments above and herein could be combined into new concept(s), in whole or in part.

Example text proposals for TS 38.321 (e.g., [3] 3GPP 38.321 v18.3.0) are shown below and one or multiple text proposals could be adopted to achieve the present invention, with changes and edits shown with double curly brackets to show deletions, i.e., {{ . . . }}, and double carets to show additions/insertions, i.e., ^^ . . . ^^:

Example 1 Start 5.2 Maintenance of Uplink Time Alignment

. . .

1> when a timeAlignmentTimer expires:

2> if the timeAlignmentTimer is associated with a PTAG and the SpCell is not configured with two PTAGs; or 2> if the timeAlignmentTimer is associated with a PTAG, the SpCell is configured with two PTAGs, and the timeAlignmentTimer associated with the other PTAG is not running:

. . .

2> else:

3> if the timeAlignmentTimer is associated with a TAG for an SCell configured with only this TAG; or 3> if the timeAlignmentTimer is associated with a TAG for an SCell, and if the SCell is configured with two TAGs and the timeAlignmentTimer associated with the other TAG is not running:

4> flush all HARQ buffers for all such SCells;

4> notify RRC to release PUCCH, if configured for all such SCells;

4> notify RRC to release SRS, if configured for all such SCells;

4> clear any configured downlink assignments and configured uplink grants for all such SCells;

4> clear any PUSCH resource for semi-persistent CSI reporting for all such SCells;

^^4> notify RRC to release PUCCH for UEI beam reporting configuration for all such SCells.^^

^^4> clear or release any configured uplink grants for UEI beam reporting for all such SCells.^^

4> maintain $N_{TA}$ (defined in TS 38.211 [8]) of this TAG.

3> else if the time AlignmentTimer is associated with a TAG for a Serving Cell configured with two TAGs, and if the timeAlignmentTimer associated with the other TAG is running, for all such Serving Cells:

. . .

Example 1 End

Example 2 Start 5.2 Maintenance of Uplink Time Alignment

. . .

1> when a timeAlignmentTimer expires:

2> if the timeAlignmentTimer is associated with a PTAG and the SpCell is not configured with two PTAGs; or 2> if the timeAlignmentTimer is associated with a PTAG, the SpCell is configured with two PTAGs, and the timeAlignmentTimer associated with the other PTAG is not running:

. . .

2> else:

3> if the timeAlignmentTimer is associated with a TAG for an SCell configured with only this TAG; or 3> if the timeAlignmentTimer is associated with a TAG for an SCell, and if the SCell is configured with two TAGs and the timeAlignmentTimer associated with the other TAG is not running:

4> flush all HARQ buffers for all such SCells;

4> notify RRC to release PUCCH, if configured for all such SCells;

4> notify RRC to release SRS, if configured for all such SCells;

4> clear any configured downlink assignments and configured uplink grants for all such SCells;

4> clear any PUSCH resource for semi-persistent CSI reporting for all such SCells;

^^4> notify RRC to release UEI beam reporting configuration for all such SCells.^^

4> maintain $N_{TA}$ (defined in TS 38.211 [8]) of this TAG.

3> else if the timeAlignmentTimer is associated with a TAG for a Serving Cell configured with two TAGs, and if the timeAlignmentTimer associated with the other TAG is running, for all such Serving Cells:

. . .

. . .

Example 2 End

Example 3 Start 5.2 Maintenance of Uplink Time Alignment

. . .

1> when a timeAlignmentTimer expires:

2> if the timeAlignmentTimer is associated with a PTAG and the SpCell is not configured with two PTAGs; or 2> if the timeAlignmentTimer is associated with a PTAG, the SpCell is configured with two PTAGs, and the timeAlignmentTimer associated with the other PTAG is not running:

. . .

2> else:

3> if the timeAlignmentTimer is associated with a TAG for an SCell configured with only this TAG; or 3> if the timeAlignmentTimer is associated with a TAG for an SCell, and if the SCell is configured with two TAGs and the timeAlignmentTimer associated with the other TAG is not running:

4> flush all HARQ buffers for all such SCells;

4> notify RRC to release PUCCH, if configured for all such SCells;

4> notify RRC to release SRS, if configured for all such SCells;

4> clear any configured downlink assignments and configured uplink grants for all such SCells;

4> clear any PUSCH resource for semi-persistent CSI reporting for all such SCells;

^^4> cancelling triggered (and not cancelled) UEI beam reporting for all such SCells.^^

4> maintain $N_{TA}$ (defined in TS 38.211 [8]) of this TAG.

3> else if the timeAlignmentTimer is associated with a TAG for a Serving Cell configured with two TAGs, and if the timeAlignmentTimer associated with the other TAG is running, for all such Serving Cells:

. . .

Example 3 End

Example 4 Start 5.2 Maintenance of Uplink Time Alignment

. . .

1> when a timeAlignmentTimer expires:

2> if the timeAlignmentTimer is associated with a PTAG and the SpCell is not configured with two PTAGs; or 2> if the timeAlignmentTimer is associated with a PTAG, the SpCell is configured with two PTAGs, and the timeAlignmentTimer associated with the other PTAG is not running:

. . .

2> else:

^^3> if the time AlignmentTimer is associated with a TAG for a Serving Cell configured with PUCCH resource or PUSCH resource for UEI beam reporting of an SCell (or a PCell):^^

^^4> notify RRC to release UEI beam reporting configuration for all such SCells (or the PCell).^^

^^4> notify RRC to release PUCCH for UEI beam reporting configuration for all such SCells (or the PCell).^^

^^4> cancelling triggered (and not cancelled) UEI beam reporting for all such SCells (or the PCell).^^

^^4> clear or release any configured uplink grants for UEI beam reporting for all such SCells (or the PCell).^^

3> if the timeAlignmentTimer is associated with a TAG for an SCell configured with only this TAG; or 3> if the timeAlignmentTimer is associated with a TAG for an SCell, and if the SCell is configured with two TAGs and the timeAlignmentTimer associated with the other TAG is not running:

. . .

3> else if the timeAlignmentTimer is associated with a TAG for a Serving Cell configured with two TAGs, and if the time AlignmentTimer associated with the other TAG is running, for all such Serving Cells:

. . .

. . .

Example 4 End

Various examples and embodiments of the present invention are described below. For the methods, alternatives, concepts, examples, and embodiments detailed above and herein, the following aspects and embodiments are possible.

Referring to FIG. 6, with this and other concepts, systems, and methods of the present invention, a method 1000 for a UE in a wireless communication system comprises in response to an expiry of a timer of a first TAG, performing one or more actions for (or on) a first Serving Cell associated with a UEI beam reporting configuration, wherein the one or more actions include at least one of: release or clear one or more resources for transmitting a UEI beam report for (or on) the first Serving cell, or not transmit a UEI beam report for (or on) the first Serving Cell, or stop using or suspend the resource for transmitting a UEI beam report for (or on) the first Serving cell, or stop using one or more resources of report notification for a UEI beam report for (or on) the first Serving cell, or cancel a triggered (and not cancelled) or pending UEI beam report for (or on) the first Serving cell, or release or clear configuration for a UEI beam report for (or on) the first Serving cell, or stop or suspend evaluation for whether to trigger a UEI beam report for (or on) the first Serving cell (step 1002).

In various embodiments, the first Serving Cell is associated with a second TAG and is not associated with the first TAG.

In various embodiments, the first Serving Cell is associated with the first TAG.

In various embodiments, the timer is timeAlignmentTimer.

In various embodiments, the UEI beam reporting configuration is CSI-ReportConfig (associated with an event).

In various embodiments, the UEI beam report for (or on) the first Serving Cell is triggered based on the UEI beam reporting configuration.

In various embodiments, the one or more resources for transmitting the UEI beam report for (or on) the first Serving Cell is configured on at least a BWP of the first Serving Cell.

In various embodiments, the one or more resources for transmitting the UEI beam report for (or on) the first Serving Cell is configured on at least a BWP of a second Serving Cell or a third Serving Cell associated with a TAG different from the first TAG.

In various embodiments, the one or more resources for transmitting the UEI beam report is a Type 1 or Type 2 configured uplink grant.

In various embodiments, the UEI beam report for the first Serving Cell is transmitted on a second Serving Cell.

In various embodiments, the UEI beam report for the first Serving Cell is transmitted on the first Serving Cell.

In various embodiments, the one or more resources of a report notification for the UEI beam report is configured on at least a BWP of the first Serving Cell.

In various embodiments, the one or more resources of a report notification for the UEI beam report is configured on at least a BWP of the second Serving Cell.

In various embodiments, the report notification is a PN.

In various embodiments, the one or more resources of a report notification for the UEI beam report is one or more PUCCH resources.

In various embodiments, the one or more resources of a report notification is associated with an SR configuration.

In various embodiments, the triggered UEI beam report is triggered by the UE based on a triggering event configured in the UEI beam reporting configuration.

In various embodiments, the triggered UEI beam report is triggered based on at least beam quality and/or cell quality of the first Serving Cell.

In various embodiments, the triggered UEI beam report is triggered based on at least beam quality and/or cell quality of a second Serving Cell.

In various embodiments, the triggered UEI beam report is not triggered based on beam quality and/or cell quality of the first Serving Cell.

In various embodiments, the evaluation includes whether beam quality and/or cell quality of a Serving Cell is higher than or lower than a threshold (for a period of time).

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) in response to an expiry of a timer of a first TAG, perform one or more actions for (or on) a first Serving Cell associated with a UEI beam reporting configuration, wherein the one or more actions include at least one of: release or clear one or more resources for transmitting a UEI beam report for (or on) the first Serving cell, or not transmit a UEI beam report for (or on) the first Serving Cell, or stop using or suspend the resource for transmitting a UEI beam report for (or on) the first Serving cell, or stop using one or more resources of report notification for a UEI beam report for (or on) the first Serving cell, or cancel a triggered (and not cancelled) or pending UEI beam report for (or on) the first Serving cell, or release or clear a configuration for a UEI beam report for (or on) the first Serving cell, or stop or suspend evaluation for whether to trigger a UEI beam report for (or on) the first Serving cell. Moreover, the CPU 308 can execute the program code 312 to perform all of the described actions, steps, and methods described above, below, or otherwise herein.

Figure 7:
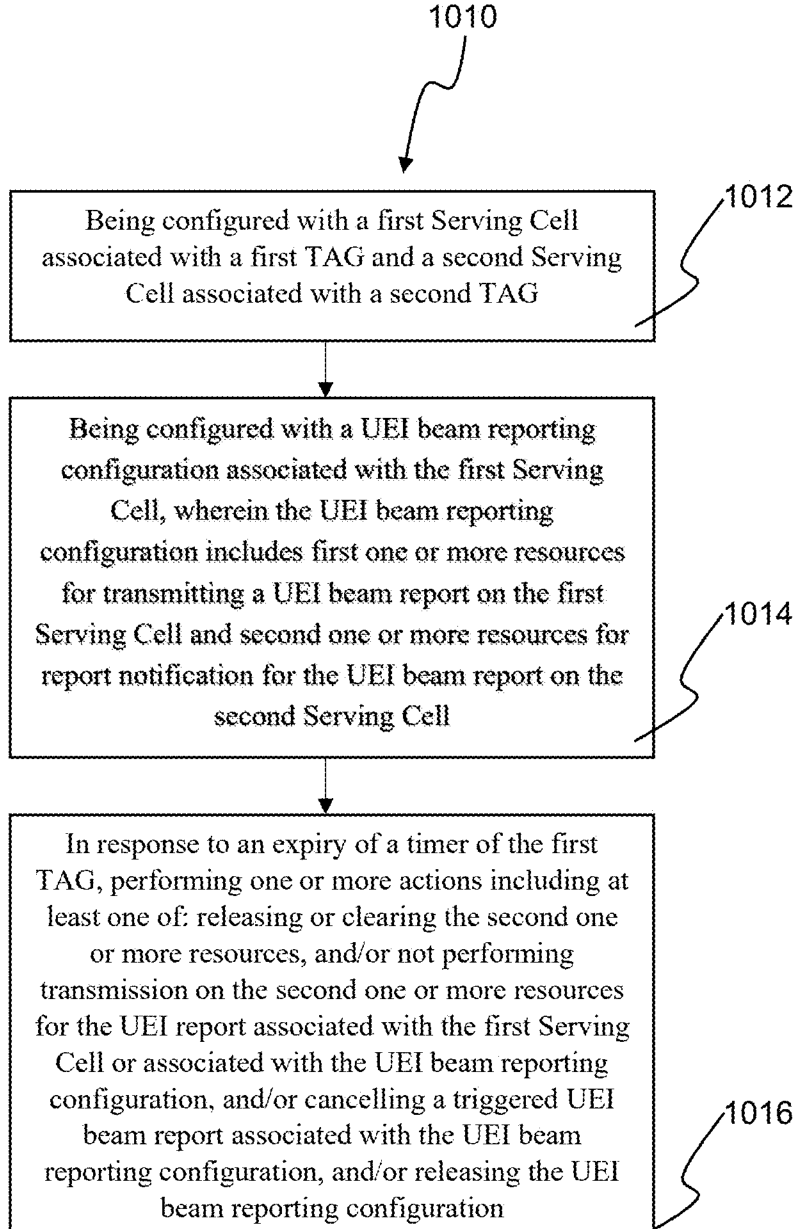
FIG. 7 is a flow diagram of a method of a UE in a wireless communication system comprising being configured with a first Serving Cell associated with a first TAG and a second Serving Cell associated with a second TAG, being configured with a UEI beam reporting configuration associated with the first Serving Cell, and in response to an expiry of a timer of the first TAG, performing one or more actions including at least one of: releasing or clearing the second one or more resources, and/or not performing transmission on the second one or more resources for the UEI report associated with the first Serving Cell or associated with the UEI beam reporting configuration, and/or cancelling a triggered UEI beam report associated with the UEI beam reporting configuration, and/or releasing the UEI beam reporting configuration, in accordance with embodiments of the present invention.

Referring to FIG. 7, with this and other concepts, systems, and methods of the present invention, a method 1010 for a UE in a wireless communication system comprises being configured with a first Serving Cell associated with a first TAG and a second Serving Cell associated with a second TAG (step 1012), being configured with a UEI beam reporting configuration associated with the first Serving Cell, wherein the UEI beam reporting configuration includes first one or more resources for transmitting a UEI beam report on the first Serving Cell and second one or more resources for report notification for the UEI beam report on the second Serving Cell (step 1014), and in response to an expiry of a timer of the first TAG, performing one or more actions including at least one of: releasing or clearing the second one or more resources, and/or not performing transmission on the second one or more resources for the UEI report associated with the first Serving Cell or associated with the UEI beam reporting configuration, and/or cancelling a triggered UEI beam report associated with the UEI beam reporting configuration, and/or releasing the UEI beam reporting configuration (step 1016).

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with a first Serving Cell associated with a first TAG and a second Serving Cell associated with a second TAG; (ii) be configured with a UEI beam reporting configuration associated with the first Serving Cell, wherein the UEI beam reporting configuration includes first one or more resources for transmitting a UEI beam report on the first Serving Cell and second one or more resources for report notification for the UEI beam report on the second Serving Cell; and (iii) in response to an expiry of a timer of the first TAG, perform one or more actions including at least one of: releasing or clearing the second one or more resources, and/or not performing transmission on the second one or more resources for the UEI report associated with the first Serving Cell or associated with the UEI beam reporting configuration, and/or cancelling a triggered UEI beam report associated with the UEI beam reporting configuration, and/or releasing the UEI beam reporting configuration. Moreover, the CPU 308 can execute the program code 312 to perform all of the described actions, steps, and methods described above, below, or otherwise herein.

Figure 8:
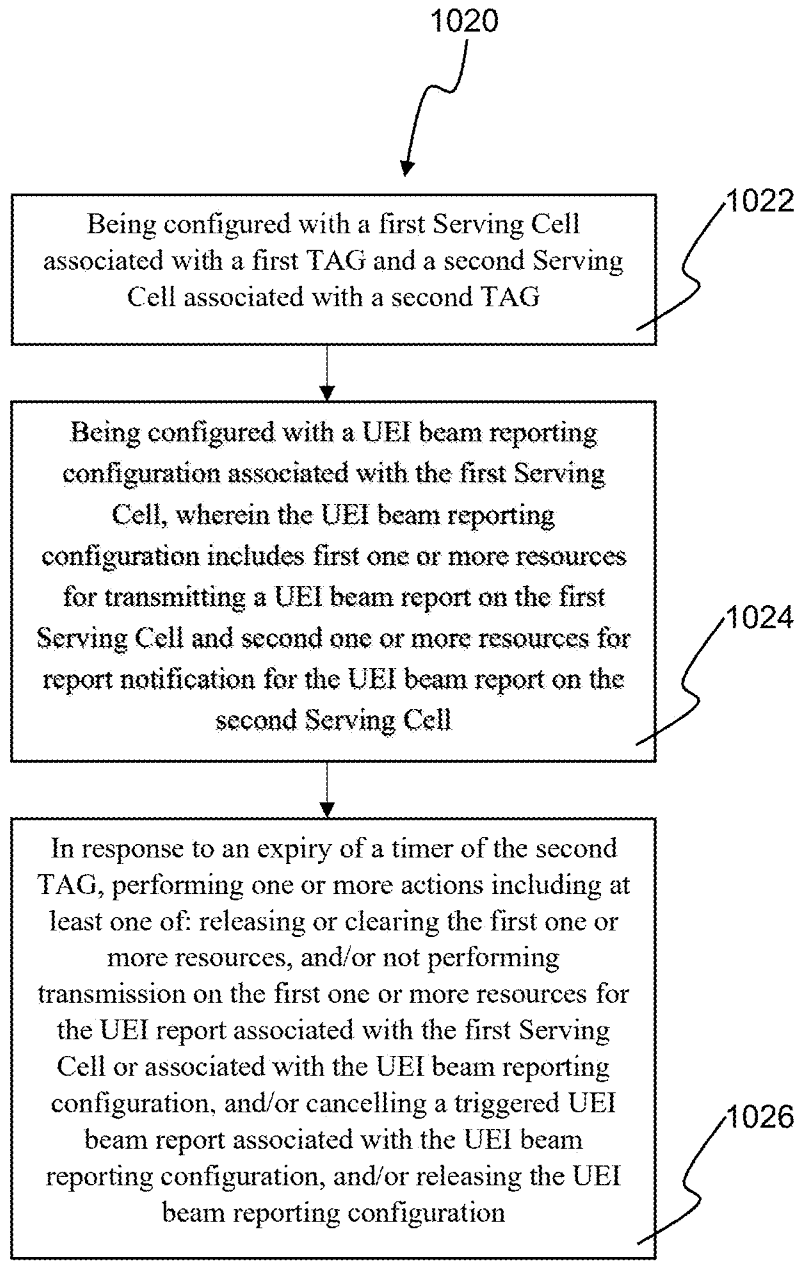
FIG. 8 is a flow diagram of a method of a UE in a wireless communication system comprising being configured with a first Serving Cell associated with a first TAG and a second Serving Cell associated with a second TAG, being configured with a UEI beam reporting configuration associated with the first Serving Cell, and in response to an expiry of a timer of the second TAG, performing one or more actions including at least one of: releasing or clearing the first one or more resources, and/or not performing transmission on the first one or more resources for the UEI report associated with the first Serving Cell or associated with the UEI beam reporting configuration, and/or cancelling a triggered UEI beam report associated with the UEI beam reporting configuration, and/or releasing the UEI beam reporting configuration, in accordance with embodiments of the present invention.

Referring to FIG. 8, with this and other concepts, systems, and methods of the present invention, a method 1020 for a UE in a wireless communication system comprises being configured with a first Serving Cell associated with a first TAG and a second Serving Cell associated with a second TAG (step 1022), being configured with a UEI beam reporting configuration associated with the first Serving Cell, wherein the UEI beam reporting configuration includes first one or more resources for transmitting a UEI beam report on the first Serving Cell and second one or more resources for report notification for the UEI beam report on the second Serving Cell (step 1024), and in response to an expiry of a timer of the second TAG, performing one or more actions including at least one of: releasing or clearing the first one or more resources, and/or not performing transmission on the first one or more resources for the UEI report associated with the first Serving Cell or associated with the UEI beam reporting configuration, and/or cancelling a triggered UEI beam report associated with the UEI beam reporting configuration, and/or releasing the UEI beam reporting configuration (step 1026).

In various embodiments, the first one or more resources is a Type 1 or Type 2 configured uplink grant.

In various embodiments, the second one or more resources are PUCCH resource(s) and/or are associated with SR configurations.

In various embodiments, the timer is timeAlignmentTimer.

In various embodiments, the UEI beam report is triggered in response to (current) beam quality of the first Serving Cell is lower than a threshold (for a period of time).

In various embodiments, the UEI beam report is triggered in response to current beam quality of the first Serving Cell a threshold lower than beam quality of a candidate beam of the first Serving Cell (for a period of time).

In various embodiments, the second Serving Cell and the first Serving Cell are associated with different TAGs.

In various embodiments, the second Serving Cell is associated with the first TAG.

In various embodiments, the second Serving Cell is associated with a second TAG and is not associated with the first TAG.

In various embodiments, timeAlignmentTimer of the second TAG is running.

In various embodiments, the first TAG is considered to be not UL time-aligned.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with a first Serving Cell associated with a first TAG and a second Serving Cell associated with a second TAG; (ii) be configured with a UEI beam reporting configuration associated with the first Serving Cell, wherein the UEI beam reporting configuration includes first one or more resources for transmitting a UEI beam report on the first Serving Cell and second one or more resources for report notification for the UEI beam report on the second Serving Cell; (iii) and in response to an expiry of a timer of the second TAG, perform one or more actions including at least one of: releasing or clearing the first one or more resources, and/or not perform transmission on the first one or more resources for the UEI report associated with the first Serving Cell or associated with the UEI beam reporting configuration, and/or cancel a triggered UEI beam report associated with the UEI beam reporting configuration, and/or release the UEI beam reporting configuration. Moreover, the CPU 308 can execute the program code 312 to perform all of the described actions, steps, and methods described above, below, or otherwise herein.

Figure 9:
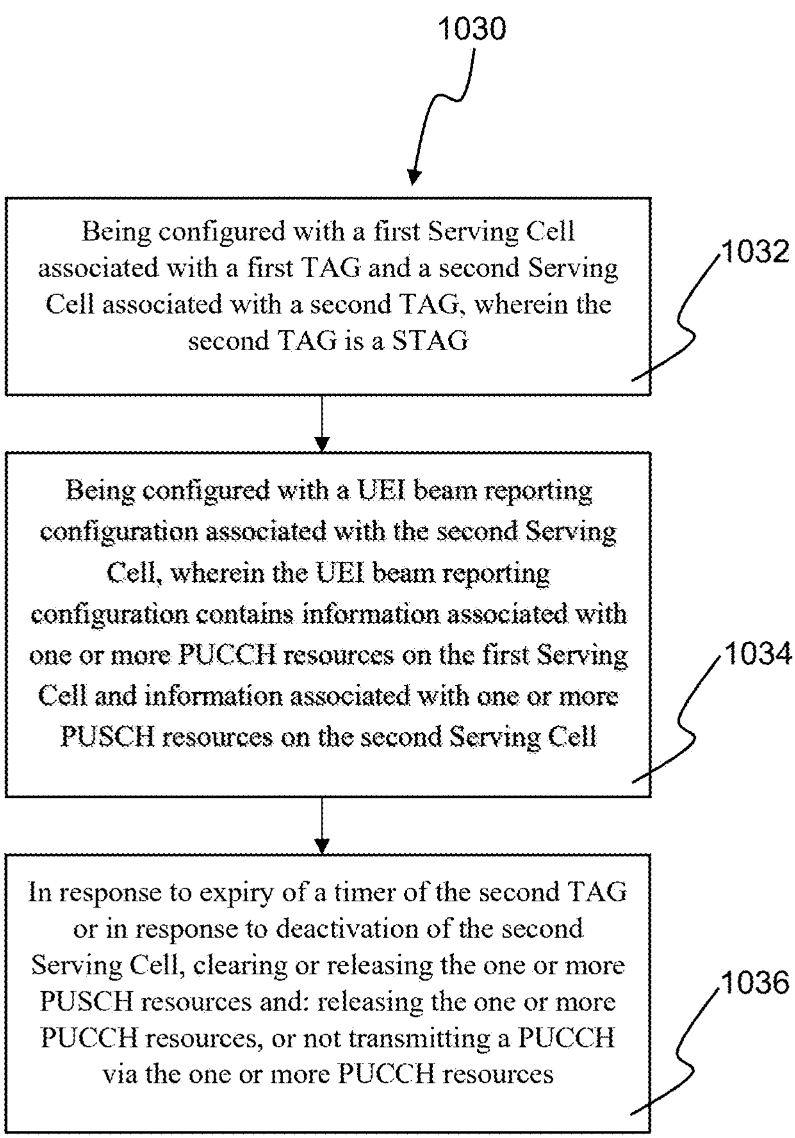
FIG. 9 is a flow diagram of a method of a UE in a wireless communication system comprising being configured with a first Serving Cell associated with a first TAG and a second Serving Cell associated with a second TAG, being configured with a UEI beam reporting configuration associated with the second Serving Cell, and in response to expiry of a timer of the second TAG or in response to deactivation of the second Serving Cell, clearing or releasing the one or more PUSCH resources and, releasing the one or more PUCCH resources or not transmitting PUCCH via the one or more PUCCH resources, in accordance with embodiments of the present invention.

Referring to FIG. 9, with this and other concepts, systems, and methods of the present invention, a method 1030 for a UE in a wireless communication system comprises being configured with a first Serving Cell associated with a first TAG and a second Serving Cell associated with a second TAG, wherein the second TAG is a STAG (step 1032), being configured with a UEI beam reporting configuration associated with the second Serving Cell, wherein the UEI beam reporting configuration contains information associated with one or more PUCCH resources on the first Serving Cell and information associated with one or more PUSCH resources on the second Serving Cell (step 1034), and in response to expiry of a timer of the second TAG or in response to deactivation of the second Serving Cell, clearing or releasing the one or more PUSCH resources and: releasing the one or more PUCCH resources, or not transmitting a PUCCH via the one or more PUCCH resources (step 1036).

In various embodiments, the first Serving Cell is a Primary Cell or a Secondary Cell.

In various embodiments, the second Serving Cell is a second Secondary Cell.

In various embodiments, the timer is timeAlignmentTimer.

In various embodiments, the UEI beam reporting configuration is CSI-ReportConfig (associated with an event).

In various embodiments, the UEI beam reporting configuration is associated with mode B.

In various embodiments, (in response to expiry of the timer of the second TAG or in response to deactivation of the second Serving Cell) the UE does not transmit the PUCCH via the one or more PUCCH resources in response to triggering a transmission of a UEI beam report associated with the UEI beam reporting configuration (based on at least the one or more PUSCH resources being cleared or released).

In various embodiments, one PUCCH resource among the one or more PUCCH resources is used to notify a network node one PUSCH resource carrying the UEI beam report among the one or more PUSCH resources.

In various embodiments, the one or more PUSCH resources are associated with a configured uplink grant type-1.

In various embodiments, the first TAG is a PTAG or a second STAG.

In various embodiments, a timeAlignmentTimer of the first TAG is running when: (1) the timer of the second TAG expires, (2) the UE releases the one or more PUCCH resources, (3) the UE releases the one or more PUSCH resources, or (4) the UE does not transmit the PUCCH via the one or more PUCCH resources.

In various embodiments, the UEI beam report is a CSI report.

In various embodiments, the UE triggers the transmission of the UEI beam report associated with the UEI beam reporting configuration based on at least a quality of a current beam of the second Serving Cell. The UE triggers the transmission of the UEI beam report associated with the UEI beam reporting configuration in response to the quality of the current beam of the second Serving Cell being lower than a threshold, or in response to the quality of the current beam of the second Serving Cell being a threshold lower than a quality of a candidate beam of the second Serving Cell.

In various embodiments, in response to expiry of the timer of the second TAG or in response to deactivation of the second Serving Cell, the UE keeps or does not release the one or more PUCCH resources in addition to not transmitting the PUCCH via the one or more PUCCH resources.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with a first Serving Cell associated with a first TAG and a second Serving Cell associated with a second TAG, wherein the second TAG is a STAG; (ii) be configured with a UEI beam reporting configuration associated with the second Serving Cell, wherein the UEI beam reporting configuration contains information associated with one or more PUCCH resources on the first Serving Cell and information associated with one or more PUSCH resources on the second Serving Cell; and (iii) in response to expiry of a timer of the second TAG or in response to deactivation of the second Serving Cell, clear or release the one or more PUSCH resources and: releasing the one or more PUCCH resources, or not transmitting a PUCCH via the one or more PUCCH resources. Moreover, the CPU 308 can execute the program code 312 to perform all of the described actions, steps, and methods described above, below, or otherwise herein.

Figure 10:
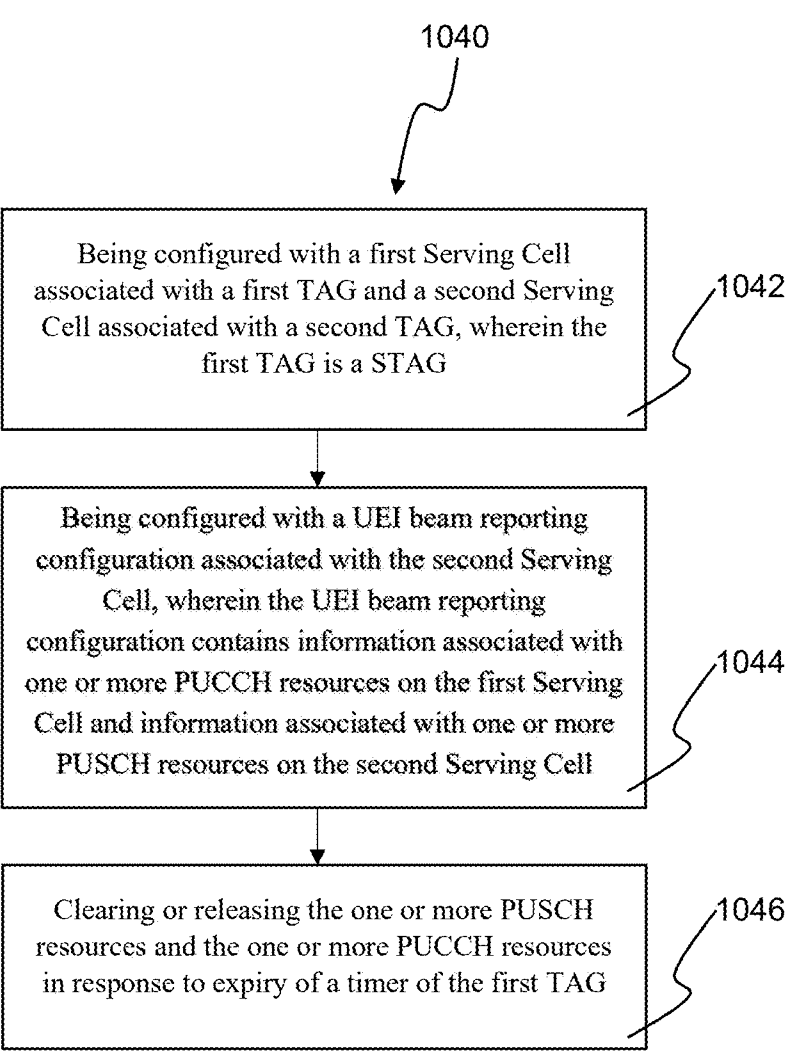
FIG. 10 is a flow diagram of a method of a UE in a wireless communication system comprising being configured with a first Serving Cell associated with a first TAG and a second Serving Cell associated with a second TAG, being configured with a UEI beam reporting configuration associated with the second Serving Cell, clearing or releasing the one or more PUSCH resources and the one or more PUCCH resources in response to expiry of a timer of the first TAG, in accordance with embodiments of the present invention.

Referring to FIG. 10, with this and other concepts, systems, and methods of the present invention, a method 1040 for a UE in a wireless communication system comprises being configured with a first Serving Cell associated with a first TAG and a second Serving Cell associated with a second TAG, wherein the first TAG is a STAG (step 1042), being configured with a UEI beam reporting configuration associated with the second Serving Cell, wherein the UEI beam reporting configuration contains information associated with one or more PUCCH resources on the first Serving Cell and information associated with one or more PUSCH resources on the second Serving Cell (step 1044), and clearing or releasing the one or more PUSCH resources and the one or more PUCCH resources in response to expiry of a timer of the first TAG (step 1046).

In various embodiments, the first Serving Cell is a first Secondary Cell, and the second Serving Cell is a second Secondary Cell.

In various embodiments, the timer is timeAlignmentTimer.

In various embodiments, the UEI beam reporting configuration is CSI-ReportConfig (associated with an event).

In various embodiments, the UEI beam reporting configuration is associated with mode B.

In various embodiments, one PUCCH resource among the one or more PUCCH resources is used to notify a network node of one PUSCH resource carrying a UEI beam report among the one or more PUSCH resources.

In various embodiments, the one or more PUSCH resources are associated with a configured uplink grant type-1.

In various embodiments, the second TAG is a PTAG or a second STAG.

In various embodiments, a timeAlignmentTimer of the second TAG is running when the timer of the first TAG expires or when the UE clears or releases the one or more PUSCH resources and the one or more PUCCH resources.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with a first Serving Cell associated with a first TAG and a second Serving Cell associated with a second TAG, wherein the first TAG is a STAG; (ii) be configured with a UEI beam reporting configuration associated with the second Serving Cell, wherein the UEI beam reporting configuration contains information associated with one or more PUCCH resources on the first Serving Cell and information associated with one or more PUSCH resources on the second Serving Cell; and (iii) clear or release the one or more PUSCH resources and the one or more PUCCH resources in response to expiry of a timer of the first TAG. Moreover, the CPU 308 can execute the program code 312 to perform all of the described actions, steps, and methods described above, below, or otherwise herein.

Figure 11:
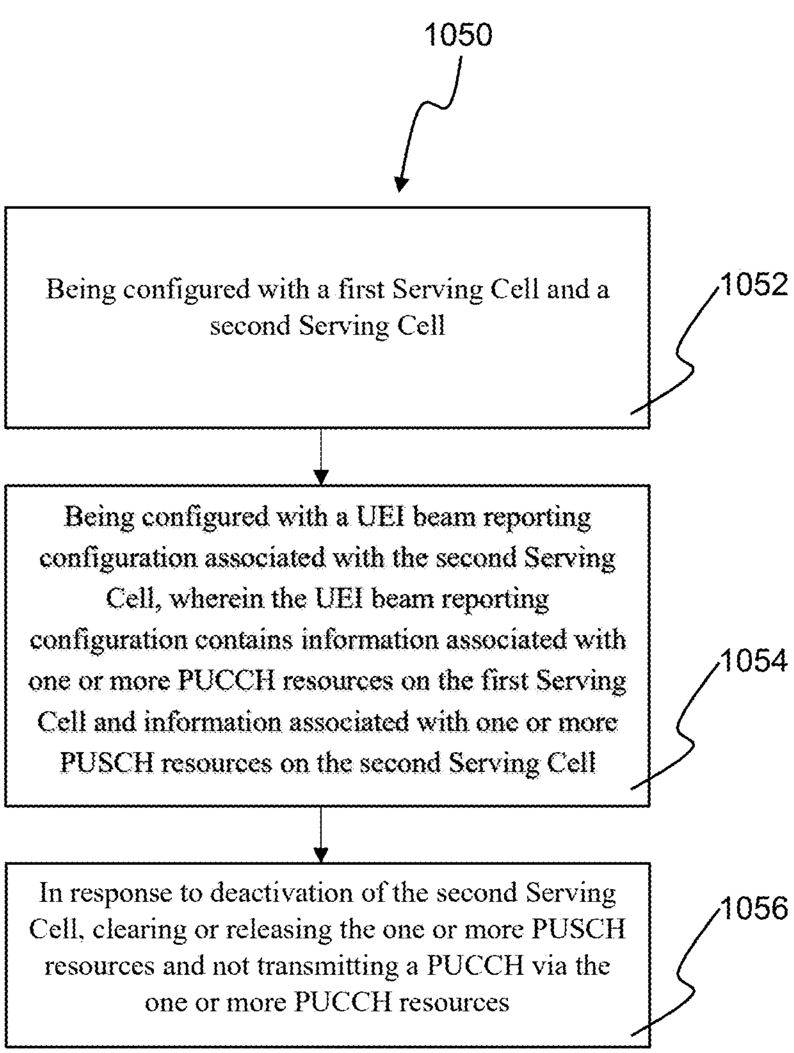
FIG. 11 is a flow diagram of a method of a UE in a wireless communication system comprising being configured with a first Serving Cell and a second Serving Cell, being configured with a UEI beam reporting configuration associated with the second Serving Cell, and in response to deactivation of the second Serving Cell, clearing or releasing the one or more PUSCH resources and not transmitting PUCCH via the one or more PUCCH resources, in accordance with embodiments of the present invention.

Referring to FIG. 11, with this and other concepts, systems, and methods of the present invention, a method 1050 for a UE in a wireless communication system comprises being configured with a first Serving Cell and a second Serving Cell (step 1052), being configured with a UEI beam reporting configuration associated with the second Serving Cell, wherein the UEI beam reporting configuration contains information associated with one or more PUCCH resources on the first Serving Cell and information associated with one or more PUSCH resources on the second Serving Cell (step 1054), and in response to deactivation of the second Serving Cell, clearing or releasing the one or more PUSCH resources and not transmitting a PUCCH via the one or more PUCCH resources (step 1056).

In various embodiments, the first Serving Cell is a Primary Cell or a Secondary Cell.

In various embodiments, the second Serving Cell is a second Secondary Cell.

In various embodiments, the UEI beam reporting configuration is CSI-ReportConfig (associated with an event).

In various embodiments, the UEI beam reporting configuration is associated with mode B.

In various embodiments, one PUCCH resource among the one or more PUCCH resources is used to notify a network node one PUSCH resource carrying the UEI beam report among the one or more PUSCH resources.

In various embodiments, the one or more PUSCH resources are associated with a configured uplink grant type-1.

In various embodiments, (in response to deactivation of the second Serving Cell) the UE does not transmit the PUCCH via the one or more PUCCH resources in response to triggering a transmission of a UEI beam report associated with the UEI beam reporting configuration (based on at least the one or more PUSCH resources being cleared or released).

In various embodiments, the UEI beam report is a CSI report.

In various embodiments, the UE triggers the transmission of the UEI beam report associated with the UEI beam reporting configuration based on at least a quality of a current beam of the second Serving Cell. The UE triggers the transmission of the UEI beam report associated with the UEI beam reporting configuration in response to the quality of the current beam of the second Serving Cell being lower than a threshold, or in response to the quality of the current beam of the second Serving Cell being a threshold lower than a quality of a candidate beam of the second Serving Cell.

In various embodiments, in response to deactivation of the second Serving Cell, the UE keeps or does not release the one or more PUCCH resources in addition to not transmitting the PUCCH via the one or more PUCCH resources.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) be configured with a first Serving Cell and a second Serving Cell; (ii) be configured with a UEI beam reporting configuration associated with the second Serving Cell, wherein the UEI beam reporting configuration contains information associated with one or more PUCCH resources on the first Serving Cell and information associated with one or more PUSCH resources on the second Serving Cell; and (iii) in response to deactivation of the second Serving Cell, clear or release the one or more PUSCH resources and not transmitting a PUCCH via the one or more PUCCH resources. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:

being configured with a first Serving Cell associated with a first Timing Advance Group (TAG) and a second Serving Cell associated with a second TAG, wherein the second TAG is a Secondary Timing Advance Group (STAG);

being configured with a UE-initiated (UEI) beam reporting configuration associated with the second Serving Cell, wherein the UEI beam reporting configuration contains information associated with one or more Physical Uplink Control Channel (PUCCH) resources on the first Serving Cell and information associated with one or more Physical Uplink Shared Channel (PUSCH) resources on the second Serving Cell;

in response to expiry of a timer of the second TAG, clearing or releasing the one or more PUSCH resources; and not transmitting a PUCCH via the one or more PUCCH resources in response to triggering a transmission of a UEI beam report associated with the UEI beam reporting configuration after the timer of the second TAG expires.

2. The method of claim 1, wherein the first Serving Cell is a Primary Cell or a Secondary Cell and the second Serving Cell is a second Secondary Cell, and wherein the first TAG is a Primary Timing Advance Group (PTAG) or a second STAG.

3. The method of claim 1, wherein the UEI beam reporting configuration is associated with mode B, and one PUCCH resource among the one or more PUCCH resources is used to notify a network node of one PUSCH resource carrying the UEI beam report among the one or more PUSCH resources.

4. The method of claim 1, wherein the UE triggers the transmission of the UEI beam report associated with the UEI beam reporting configuration based on at least a quality of a current beam of the second Serving Cell.

5. The method of claim 1, wherein the UEI beam report is a CSI report.

6. The method of claim 1, wherein the timer is timeAlignmentTimer.

7. The method of claim 1, wherein the UEI beam reporting configuration is Channel State Information (CSI)-ReportConfig.

8. The method of claim 1, wherein the one or more PUSCH resources are associated with a configured uplink grant type-1.

9. The method of claim 1, wherein a timeAlignmentTimer of the first TAG is running when: (1) the timer of the second TAG expires, (2) the UE releases the one or more PUSCH resources, or (3) the UE does not transmit the PUCCH via the one or more PUCCH resources.

10. The method of claim 1, wherein in response to expiry of the timer of the second TAG, the UE keeps or does not release the one or more PUCCH resources in addition to not transmitting the PUCCH via the one or more PUCCH resources.

11. A User Equipment (UE), comprising:

a memory; and a processor operatively coupled with the memory, wherein the processor is configured to execute a program code to:

be configured with a first Serving Cell associated with a first Timing Advance Group (TAG) and a second Serving Cell associated with a second TAG, wherein the second TAG is a Secondary Timing Advance Group (STAG);

be configured with a UE-initiated (UEI) beam reporting configuration associated with the second Serving Cell, wherein the UEI beam reporting configuration contains information associated with one or more Physical Uplink Control Channel (PUCCH) resources on the first Serving Cell and information associated with one or more Physical Uplink Shared Channel (PUSCH) resources on the second Serving Cell;

in response to expiry of a timer of the second TAG, clear or release the one or more PUSCH resources; and not transmit a PUCCH via the one or more PUCCH resources in response to triggering a transmission of a UEI beam report associated with the UEI beam reporting configuration after the timer of the second TAG expires.

12. The UE of claim 11, wherein the first Serving Cell is a Primary Cell or a Secondary Cell and the second Serving Cell is a second Secondary Cell, and wherein the first TAG is a Primary Timing Advance Group (PTAG) or a second STAG.

13. The UE of claim 11, wherein the UEI beam reporting configuration is associated with mode B, and one PUCCH resource among the one or more PUCCH resources is used to notify a network node of one PUSCH resource carrying the UEI beam report among the one or more PUSCH resources.

14. The UE of claim 11, wherein the UE triggers the transmission of the UEI beam report associated with the UEI beam reporting configuration based on at least a quality of a current beam of the second Serving Cell.

15. The UE of claim 11, wherein the UEI beam report is a CSI report.

16. The UE of claim 11, wherein the timer is timeAlignmentTimer.

17. The UE of claim 11, wherein the UEI beam reporting configuration is Channel State Information (CSI)-ReportConfig.

18. The UE of claim 11, wherein the one or more PUSCH resources are associated with a configured uplink grant type-1.

19. The UE of claim 11, wherein a timeAlignmentTimer of the first TAG is running when: (1) the timer of the second TAG expires, (2) the UE releases the one or more PUSCH resources, or (3) the UE does not transmit the PUCCH via the one or more PUCCH resources.

20. The UE of claim 11, wherein in response to expiry of the timer of the second TAG, the UE keeps or does not release the one or more PUCCH resources in addition to not transmitting the PUCCH via the one or more PUCCH resources.

* * * * *